(12) United States Patent
Guo et al.

(10) Patent No.: US 12,069,451 B2
(45) Date of Patent: Aug. 20, 2024

(54) USER HEARING PROTECTION METHOD, APPARATUS, AND ELECTRONIC DEVICE

(71) Applicant: Honor Device Co., Ltd., Shenzhen (CN)

(72) Inventors: Zhiwei Guo, Shenzhen (CN); Song Lin, Shenzhen (CN); Yanbin An, Shenzhen (CN); Wen Shu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 147 days.

(21) Appl. No.: 17/779,149

(22) PCT Filed: Nov. 11, 2020

(86) PCT No.: PCT/CN2020/128073
§ 371 (c)(1),
(2) Date: May 24, 2022

(87) PCT Pub. No.: WO2021/115006
PCT Pub. Date: Jun. 17, 2021

(65) Prior Publication Data
US 2022/0417658 A1    Dec. 29, 2022

(30) Foreign Application Priority Data

Dec. 11, 2019    (CN) .......................... 201911265119.0

(51) Int. Cl.
*H04R 3/04* (2006.01)
*H04R 5/033* (2006.01)
*H04R 5/04* (2006.01)

(52) U.S. Cl.
CPC ............... *H04R 3/04* (2013.01); *H04R 5/033* (2013.01); *H04R 5/04* (2013.01); *H04R 2430/01* (2013.01)

(58) Field of Classification Search
CPC . H04R 3/04; H04R 5/033; H04R 5/04; H04R 2430/01; H04R 1/1041; H04R 29/00; G06F 3/165; G08B 21/24
See application file for complete search history.

(56) References Cited

U.S. PATENT DOCUMENTS 7,003,123 B2    2/2006  Kanevsky et al.
9,524,731 B2 *  12/2016 Kraft .................. H04R 3/04
(Continued)

FOREIGN PATENT DOCUMENTS

CN    1819451 A    8/2006
CN    101060314 A   10/2007
(Continued)

*Primary Examiner* — Akelaw Teshale
(74) *Attorney, Agent, or Firm* — WOMBLE BOND DICKINSON (US) LLP

(57) ABSTRACT

Embodiments of this application provide a user hearing protection method, apparatus, and electronic device. In the method, after an electronic device enables a hearing protection mode, when an audio output mode is a headset output, sound pressure output by the headset is obtained based on current-frame sound source data; when the sound pressure is greater than a predetermined sound pressure threshold, an instantaneous sound pressure over-standard warning is performed, and an instantaneous sound pressure over-standard protection operation is performed on the electronic device. In addition, after the output sound pressure is obtained, the sound pressure may be stored, and a sound dose accumulated to a current moment may be determined based on the stored historical sound pressure data; when the sound dose is greater than a predetermined sound dose standard value, sound dose over-standard warning and a sound dose over-standard protection operation are performed.

16 Claims, 13 Drawing Sheets

(56) References Cited

U.S. PATENT DOCUMENTS

| | | | |
|---|---|---|---|
| 9,980,028 B2 | 5/2018 | Mcneill et al. | |
| 10,674,247 B2 | 6/2020 | Song et al. | |
| 10,789,037 B2 | 9/2020 | Wang et al. | |
| 11,388,502 B1 * | 7/2022 | Parry | H04R 1/1083 |
| 2007/0253572 A1 | 11/2007 | Li et al. | |
| 2007/0281762 A1 | 12/2007 | Barros et al. | |
| 2010/0150378 A1 * | 6/2010 | Lee | H03G 7/004 |
| | | | 381/104 |
| 2016/0316306 A1 * | 10/2016 | Nooralahiyan | G06F 3/162 |
| 2017/0188166 A1 * | 6/2017 | Eberbach | H04R 29/008 |
| 2017/0201836 A1 * | 7/2017 | Hui | G06F 3/165 |

FOREIGN PATENT DOCUMENTS

| | | | | |
|---|---|---|---|---|
| CN | 101060724 A | * | 10/2007 | |
| CN | 101060724 A | | 10/2007 | |
| CN | 108834020 A | | 11/2018 | |
| CN | 108989931 A | | 12/2018 | |
| CN | 110460927 A | | 11/2019 | |
| EP | 3531275 A1 | | 8/2019 | |
| WO | WO-2014030998 A1 | * | 2/2014 | H04R 1/1041 |
| WO | WO-2016115622 A1 | * | 7/2016 | A61F 11/08 |
| WO | 2017156880 A1 | | 9/2017 | |
| WO | 2017222831 A1 | | 12/2017 | |
| WO | 2018028071 A1 | | 2/2018 | |
| WO | WO-2018148356 A1 | * | 8/2018 | A61F 2/06 |

\* cited by examiner

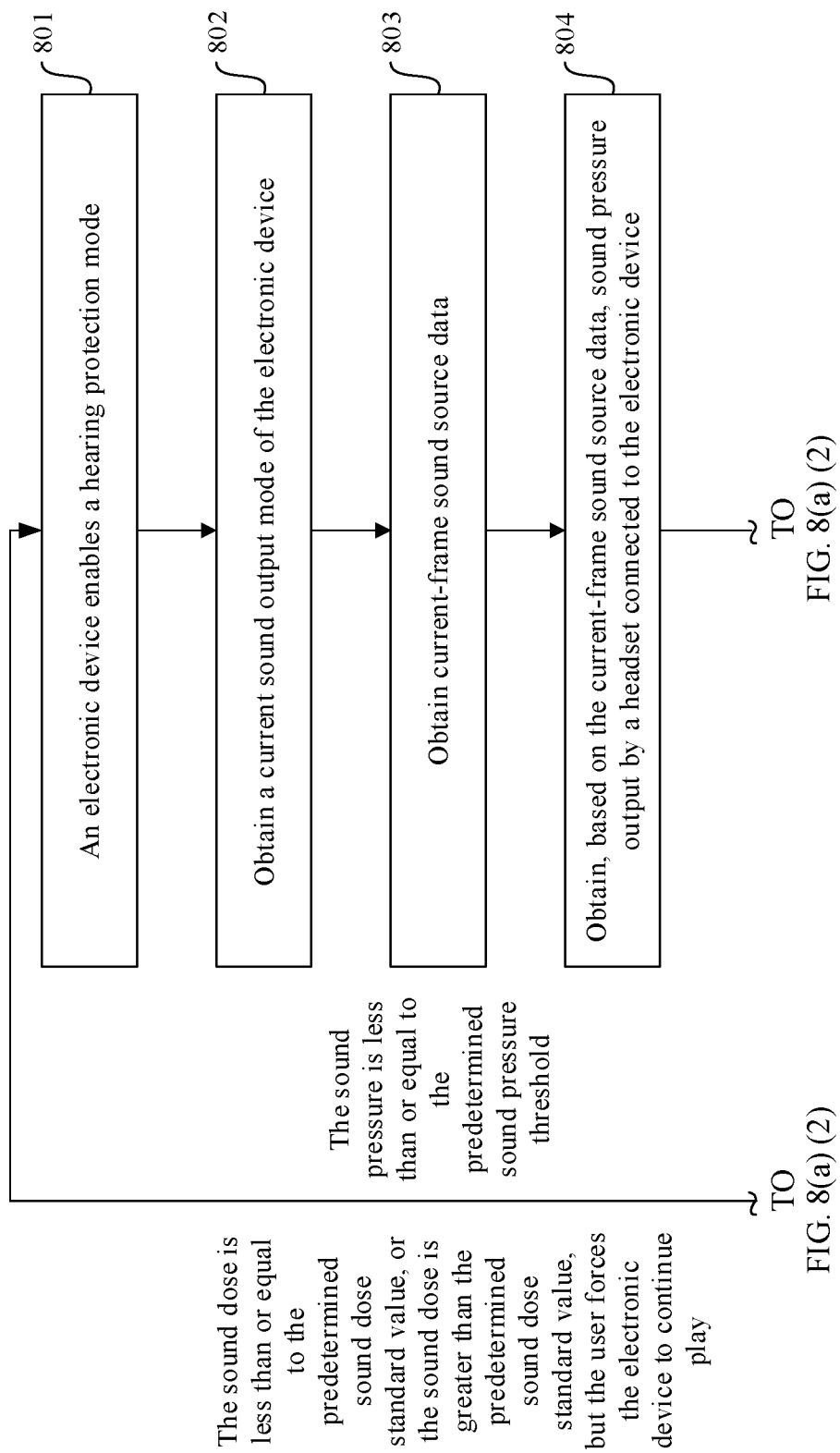
FIG. 8(a) (1)

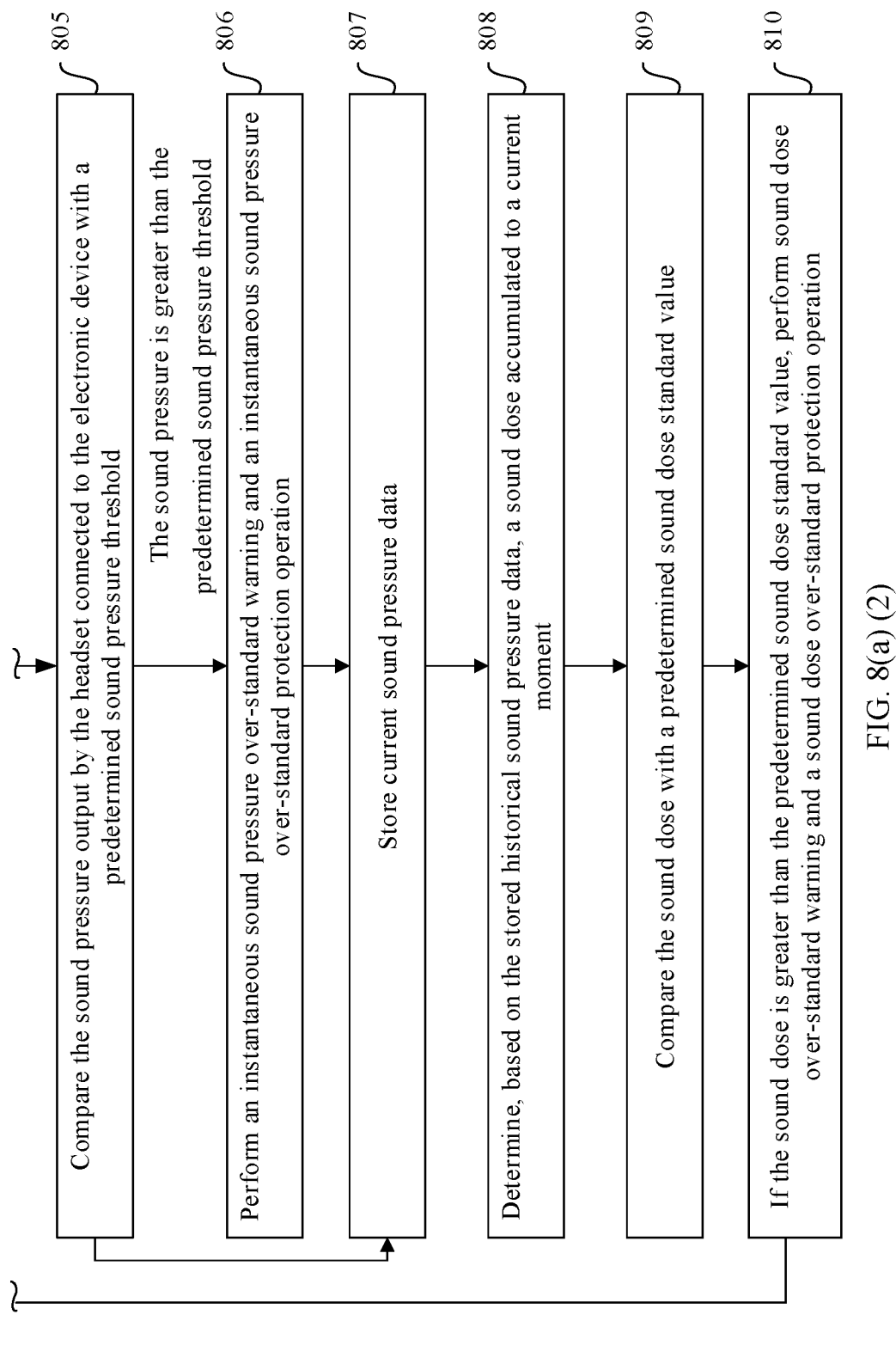

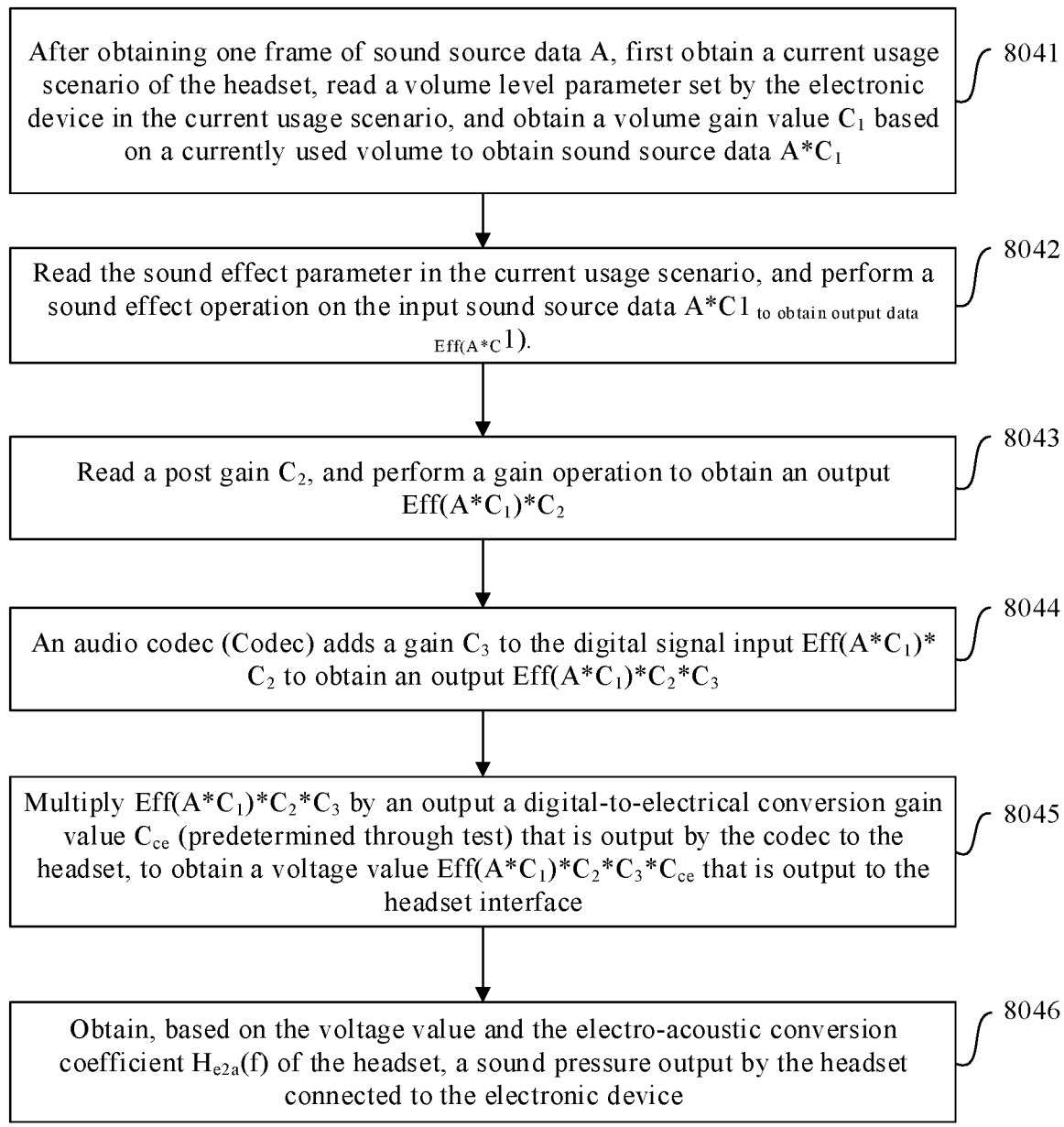

After obtaining one frame of sound source data A, first obtain a current usage scenario of the headset, read a volume level parameter set by the electronic device in the current usage scenario, and obtain a volume gain value $C_1$ based on a currently used volume to obtain sound source data $A*C_1$ ⟶ 8041

Read the sound effect parameter in the current usage scenario, and perform a sound effect operation on the input sound source data $A*C_1$ to obtain output data $Eff(A*C_1)$. ⟶ 8042

Read a post gain $C_2$, and perform a gain operation to obtain an output $Eff(A*C_1)*C_2$ ⟶ 8043

An audio codec (Codec) adds a gain $C_3$ to the digital signal input $Eff(A*C_1)*C_2$ to obtain an output $Eff(A*C_1)*C_2*C_3$ ⟶ 8044

Multiply $Eff(A*C_1)*C_2*C_3$ by an output a digital-to-electrical conversion gain value $C_{ce}$ (predetermined through test) that is output by the codec to the headset, to obtain a voltage value $Eff(A*C_1)*C_2*C_3*C_{ce}$ that is output to the headset interface ⟶ 8045

Obtain, based on the voltage value and the electro-acoustic conversion coefficient $H_{e2a}(f)$ of the headset, a sound pressure output by the headset connected to the electronic device ⟶ 8046

FIG. 8 (b)

USER HEARING PROTECTION METHOD, APPARATUS, AND ELECTRONIC DEVICE

This application is a National Stage of International Application No. PCT/CN2020/128073, filed Nov. 11, 2020, which claims priority to Chinese Patent Application No. 201911265119.0, filed Dec. 11, 2019, both of which are hereby incorporated by reference in their entireties.

FIELD

This application relates to the field of electronic device technologies, and in particular, to a user hearing protection method, apparatus, and electronic device.

BACKGROUND

Most users, especially young people, now prefer to use headsets to listen to music, watch a video, listen to a book, or listen to the radio on electronic devices (such as smartphones, tablet computers, notebook computers, and/or audio players). In particular, some users like to listen to loud music or listen to music for a long time. In this case, the user's hearing will be at risk of impairment. A survey made by the World Health Organization shows that 1.1 billion young people (12-35 years old) are at risk of hearing loss. Excessive volume of personal audio devices and continuous listening to music for a long time are important reasons for the risk. With popularization of electronic devices such as mobile phones and tablet computers worldwide, a quantity of people at risk of hearing loss and a quantity of people with impaired hearing increase year by year.

In a current audio play terminal device, the safety regulation EN50332 requires that when unique test sound source is played, sound pressure at a maximum play level of a headset should be less than 100 dB (A-weighted), and sound pressure at a protection level should be less than 85 dB (A-weighted). The hearing protection means is undiversified. When the amplitude of the audio source heard by the user is greater than the amplitude of the unique test sound source, the instantaneous sound pressure heard by the user may still be greater than 100 dB (A-weighted). When the instantaneous sound pressure heard by the user exceeds 100 dB (A-weighted), auditory nerve cells of the user will be impaired to a certain extent. Therefore, a solution needs to be provided to effectively protect the hearing of the user when the user uses a headset to listen to music, watch a video, listen to a book, or listen to the radio.

SUMMARY

This application provides a user hearing protection method, apparatus, and electronic device. This application further provides a computer readable storage medium, to protect a user's hearing when a user uses a headset to listen to music, watch a video, listen to a book, listen to the radio, play a game, or make a call.

According to one embodiment, this application provides a user hearing protection method, including:

after the electronic device enables a hearing protection mode, when a current sound output mode of the electronic device is a headset output, obtaining current-frame sound source data; In one embodiment, the electronic device may obtain the current sound output mode based on current register or parameter data of an audio channel; if the current sound output mode of the electronic device is a speaker or a receiver, the electronic device automatically disables the hearing protection function and prompts a user that the current sound output mode is a non-headset mode; or if the current sound output mode of the electronic device is the headset output, the electronic device normally switches to the hearing protection mode to obtain the current-frame sound source data;

obtaining, based on the current-frame sound source data, sound pressure output by a headset connected to the electronic device; that is, in this embodiment, the sound pressure output by the headset connected to the electronic device may be obtained based on the current-frame sound source data; no sound pressure sensor needs to be added to the headset cavity, and no headset data transmission interface or protocol needs to be changed; the headset connected to the electronic device may be a headset connected to the electronic device by using a headset cable, or may be a Bluetooth headset connected to the electronic device by using Bluetooth; this embodiment imposes no limitation on a specific form of the headset connected to the electronic device;

comparing the sound pressure with a predetermined sound pressure threshold; and if the sound pressure is greater than the predetermined sound pressure threshold, performing an instantaneous sound pressure over-standard warning and an instantaneous sound pressure over-standard protection operation. The instantaneous sound pressure over-standard protection operation may be preset by a user of the electronic device. The instantaneous sound pressure over-standard protection operation may include: disabling play, reducing volume, or another operation set by the user. This embodiment imposes no limitation on a specific operation of the instantaneous sound pressure over-standard protection operation.

That is, when the sound pressure is greater than the predetermined sound pressure threshold, the electronic device performs an instantaneous sound pressure over-standard warning, and performs, on the electronic device and based on the operation preset by the user, an operation such as disabling play, reducing volume, or another possible set by the user.

In the foregoing user hearing protection method, after the electronic device enables the hearing protection mode, when the current sound output mode of the electronic device is output by the headset, the current-frame sound source data is obtained; the sound pressure output by the headset connected to the electronic device is obtained based on the current-frame sound source data; the sound pressure is compared with a predetermined sound pressure threshold; if the sound pressure is greater than the predetermined sound pressure threshold, the instantaneous sound pressure over-standard warning is performed on the electronic device, and the instantaneous sound pressure over-standard protection operation is performed on the electronic device. In this way, the user's hearing can be protected when the instantaneous sound pressure exceeds a standard in scenarios in which the user uses the headset to listen to music, watch a video, listen to a book, listen to the radio, play a game, make a call, or the like.

In a possible implementation, the obtaining, based on the current-frame sound source data, sound pressure output by a headset connected to the electronic device includes:

obtaining a current usage scenario of the headset, where the current usage scenario of the headset may include: audio play, video play, gaming, making a call, or the like.

obtaining, based on the current-frame sound source data and a sound effect change and a gain value that are of a channel corresponding to the usage scenario, a digital signal value output to a headset interface of the electronic device;

obtaining, based on the digital signal value and a digital-to-electrical conversion gain value of the electronic device, a voltage value output to the headset interface; and obtaining, based on the voltage value and an electro-acoustic conversion coefficient of the headset, sound pressure output by the headset.

In this embodiment, the sound pressure output from the headset connected to the electronic device may be obtained based on the current-frame sound source data, which is completely implemented by using software. No sound pressure sensor needs to be added to the headset cavity, and no headset data transmission interface or protocol needs to be changed.

In a possible implementation, after the obtaining, based on the current-frame sound source data, sound pressure output by a headset connected to the electronic device, further including:

storing the sound pressure corresponding to the current-frame sound source data;

determining, based on the stored historical sound pressure data, a sound dose accumulated to a current moment; In one embodiment, the sound dose accumulated to the current moment may be calculated based on the historical sound pressure data stored in the memory and a sound dose calculation method;

comparing the sound dose with a predetermined sound dose standard value, where the predetermined sound dose standard value may be a sound dose standard value specified in an international standard or a domestic standard, or may be a user-defined sound dose standard value; and if the sound dose is greater than the predetermined sound dose standard value, performing sound dose over-standard warning and a sound dose over-standard protection operation.

The sound dose over-standard protection operation may be preset by a user of the electronic device, and the sound dose over-standard protection operation may include: reminding the user to pause using the headset mode to avoid hearing impairment, recommending the user to rest for X hours before using the headset mode, and performing an operation such as disabling play, reducing volume, or another possible set by the user.

This embodiment implements early warning and hearing protection for a user when a total sound dose exceeds a standard after music is listened continuously for a long time.

In a possible implementation, before the obtaining current-frame sound source data, further including:

detecting operation information of a user of an electronic device, where the operation information may include: The user performs a tap, a long press, or another operation on an interface of the electronic device; or the operation information may include operation information entered by the user to the electronic device by using a voice;

enabling a hearing protection mode of the electronic device in response to the operation information; that is, in specific implementation, the electronic device may detect a tap, a long press, or another operation performed by the user on the interface of the electronic device, or operation information entered by the user by using a voice, and then enable the hearing protection mode of the electronic device in response to the operation information; and obtaining and storing the instantaneous sound pressure over-standard protection operation and the sound dose over-standard protection operation that are set by the user.

In a possible implementation, before the obtaining, based on the voltage value and an electro-acoustic conversion coefficient of the headset, sound pressure output by the headset, further including:

after the electronic device plays unique voice source data, obtaining electrical signal time domain data at a headset interface of the electronic device, and obtaining acoustic signal time domain data output by the headset; and obtaining the electro-acoustic conversion coefficient of the headset based on the electrical signal time domain data and the acoustic signal time domain data.

In a possible implementation, the obtaining, based on the voltage value and an electro-acoustic conversion coefficient of the headset, sound pressure output by the headset includes:

converting the voltage value into electrical signal frequency domain data;

obtaining acoustic signal frequency domain data based on the electrical signal frequency domain data and the electro-acoustic conversion coefficient;

converting the acoustic signal frequency domain data into acoustic signal time domain data; and obtaining, based on the acoustic signal time domain data, the sound pressure output by the headset.

According to one embodiment, this application provides a user hearing protection apparatus, including:

an obtaining module, configured to: after the electronic device enables a hearing protection mode, when a current sound output mode of the electronic device is a headset output, obtain current-frame sound source data; and obtain, based on the current-frame sound source data, sound pressure output by a headset connected to the electronic device; and a comparison module, configured to the sound pressure with a predetermined sound pressure threshold; and a protection module, configured to: if the sound dose is greater than the predetermined sound dose standard value, perform sound dose over-standard warning and a sound dose over-standard protection operation.

In a possible implementation, the obtaining module includes:

a scenario obtaining submodule, configured to obtain a current usage scenario of the headset;

a voltage value obtaining submodule, configured to: obtain, based on the current-frame sound source data and a sound effect change and a gain value that are of a channel corresponding to the usage scenario, a digital signal value output to a headset interface of the electronic device; and obtain, based on the digital signal value and a digital-to-electrical conversion gain value of the electronic device, a voltage value output to the headset interface; and a sound pressure obtaining submodule, configured to obtain, based on the voltage value and an electro-acoustic conversion coefficient of the headset, sound pressure output by the headset.

In a possible implementation, the apparatus further includes:

a storage module, configured to: after the obtaining module obtains the sound pressure output by the headset connected to the electronic device, store the sound pressure corresponding to the current-frame sound source data; and a determining module, configured to determine, based on the stored historical sound pressure data, a sound dose accumulated to a current moment; and the comparison module is further configured to compare the sound dose with a predetermined sound dose standard value; and the protection module is further configured to: when the sound dose is greater than the predetermined sound dose standard value, perform sound dose over-standard warning and a sound dose over-standard protection operation.

In a possible implementation, the apparatus further includes:

a detection module, configured to: before the obtaining module obtains the current-frame sound source data, detect operation information of a user of an electronic device;

an enabling module, configured to enable a hearing protection mode of the electronic device in response to the operation information detected by the detection module; and an operation obtaining module, configured to obtain an instantaneous sound pressure over-standard protection operation and a sound dose over-standard protection operation that are set by the user; and a storage module, configured to store the instantaneous sound pressure over-standard protection operation and the sound dose over-standard protection operation that are obtained by the obtaining module.

In a possible implementation, the obtaining module further includes:

a coefficient obtaining submodule, configured to: before the sound pressure obtaining submodule obtains the sound pressure output by the headset, and after the electronic device plays unique sound source data, obtain electrical signal time domain data at a headset interface of the electronic device, and obtain acoustic signal time domain data output by the headset; and obtain an electro-acoustic conversion coefficient of the headset based on the electrical signal time domain data and the acoustic signal time domain data.

In a possible implementation, the sound pressure obtaining submodule is configured to: convert the voltage value into electrical signal frequency domain data, and obtain acoustic signal frequency domain data based on the electrical signal frequency domain data and the electro-acoustic conversion coefficient; and convert the acoustic signal frequency domain data into acoustic signal time domain data, and obtain, based on the acoustic signal time domain data, the sound pressure output by the headset.

According to one embodiment, this application provides an electronic device, including:

a display unit; one or more processors; a memory; a single audio channel; an input unit; application programs; and one or more computer programs, where the one or more computer programs are stored in the memory, the one or more computer programs include an instruction, and when the instruction is executed by the device, the device is enabled to perform the following steps:

after the electronic device enables a hearing protection mode, when a current sound output mode of the electronic device is a headset output, obtaining current-frame sound source data;

obtaining, based on the current-frame sound source data, sound pressure output by a headset connected to the electronic device;

comparing the sound pressure with a predetermined sound pressure threshold; and if the sound pressure is greater than the predetermined sound pressure threshold, performing an instantaneous sound pressure over-standard warning and an instantaneous sound pressure over-standard protection operation.

In a possible implementation, when the instruction is executed by the device, that the device is enabled to perform the step of obtaining, based on the current-frame sound source data, sound pressure output by a headset connected to the electronic device includes:

obtaining a current usage scenario of the headset;

obtaining, based on the current-frame sound source data and a sound effect change and a gain value that are of a channel corresponding to the usage scenario, a digital signal value output to a headset interface of the electronic device;

obtaining, based on the digital signal value and a digital-to-electrical conversion gain value of the electronic device, a voltage value output to the headset interface; and obtaining, based on the voltage value and an electro-acoustic conversion coefficient of the headset, sound pressure output by the headset.

In a possible implementation, when the instruction is executed by the device, after the device is enabled to perform the step of obtaining, based on the current-frame sound source data, sound pressure output by a headset connected to the electronic device, the following steps are further performed:

storing the sound pressure corresponding to the current-frame sound source data;

determining, based on the stored historical sound pressure data, a sound dose accumulated to a current moment;

comparing the sound dose with a predetermined sound dose standard value; and if the sound dose is greater than the predetermined sound dose standard value, performing sound dose over-standard warning and a sound dose over-standard protection operation.

In a possible implementation, when the instruction is executed by the device, before the device is enabled to perform the step of obtaining current-frame sound source data, the following steps are further performed:

detecting operation information of a user of an electronic device;

enabling a hearing protection mode of the electronic device in response to the operation information; and obtaining and storing the instantaneous sound pressure over-standard protection operation and the sound dose over-standard protection operation that are set by the user.

In a possible implementation, when the instruction is executed by the device, before the device is enabled to perform the step of obtaining, based on the voltage value and an electro-acoustic conversion coefficient of the headset, sound pressure output by the headset, the following steps are further performed:

after the electronic device plays unique voice source data, obtaining electrical signal time domain data at a headset interface of the electronic device, and obtaining acoustic signal time domain data output by the headset; and obtaining the electro-acoustic conversion coefficient of the headset based on the electrical signal time domain data and the acoustic signal time domain data.

In a possible implementation, when the instruction is executed by the device, that the device is enabled to perform the step of obtaining, based on the voltage value and an electro-acoustic conversion coefficient of the headset, sound pressure output by the headset includes:

converting the voltage value into electrical signal frequency domain data;

obtaining acoustic signal frequency domain data based on the electrical signal frequency domain data and the electro-acoustic conversion coefficient;

converting the acoustic signal frequency domain data into acoustic signal time domain data; and obtaining, based on the acoustic signal time domain data, the sound pressure output by the headset.

According to one embodiment, this application provides a computer readable storage medium, where the computer readable storage medium stores a computer program, and when the computer program is run on a computer, the computer is enabled to perform the method according to the embodiments.

According to one embodiment, this application provides a computer program, where when the computer program is executed by a computer, the computer program is used to perform the method according to the embodiments.

In a possible design, the program in the embodiments may be completely or partially stored in a storage medium that is packaged with the processor, or may be partially or completely stored in a memory that is not packaged with the processor.

BRIEF DESCRIPTION OF DRAWINGS

FIG. 8(a)(1)-FIG. 8(a)(2) are a flowchart of still another embodiment of a user hearing protection method according to this application;

FIG. 8(b) is a flowchart of an embodiment of obtaining sound pressure output by a headset in a user hearing protection method according to this application;

DESCRIPTION OF EMBODIMENTS

The terms used in the implementations of this application are merely used to explain specific embodiments of this application, and are not intended to limit this application.

In a current audio play terminal device, the safety regulation EN50332 requires that when unique test sound source is played, sound pressure at a maximum play level of a headset should be less than 100 dB (A-weighted), and sound pressure at a protection level should be less than 85 dB (A-weighted). The hearing protection means is undiversified. When an amplitude of the audio source heard by the user is greater than an amplitude of the unique test sound source, the instantaneous sound pressure heard by the user may still be greater than 100 dB (A-weighted). When the instantaneous sound pressure heard by the user exceeds 100 dB (A-weighted), auditory nerve cells of the user will be impaired to a certain extent; not only the high instantaneous sound pressure will cause hearing impairment, but also a cumulative sound dose is generated when the user uses the headset for a long time on the terminal device. The current protection method cannot prevent the cumulative impairment effect caused by the long-term use of the headset.

To better protect the user's hearing, a new safety standard provides two possible safety requirement solutions. The first solution is consistent with existing requirements, and the second solution recommended in the new safety standard limits the sound dose generated by the cumulative effect because of listening to music for a long time. However, the current electronic device does not provide an effective means for the second solution.

Figure 1:
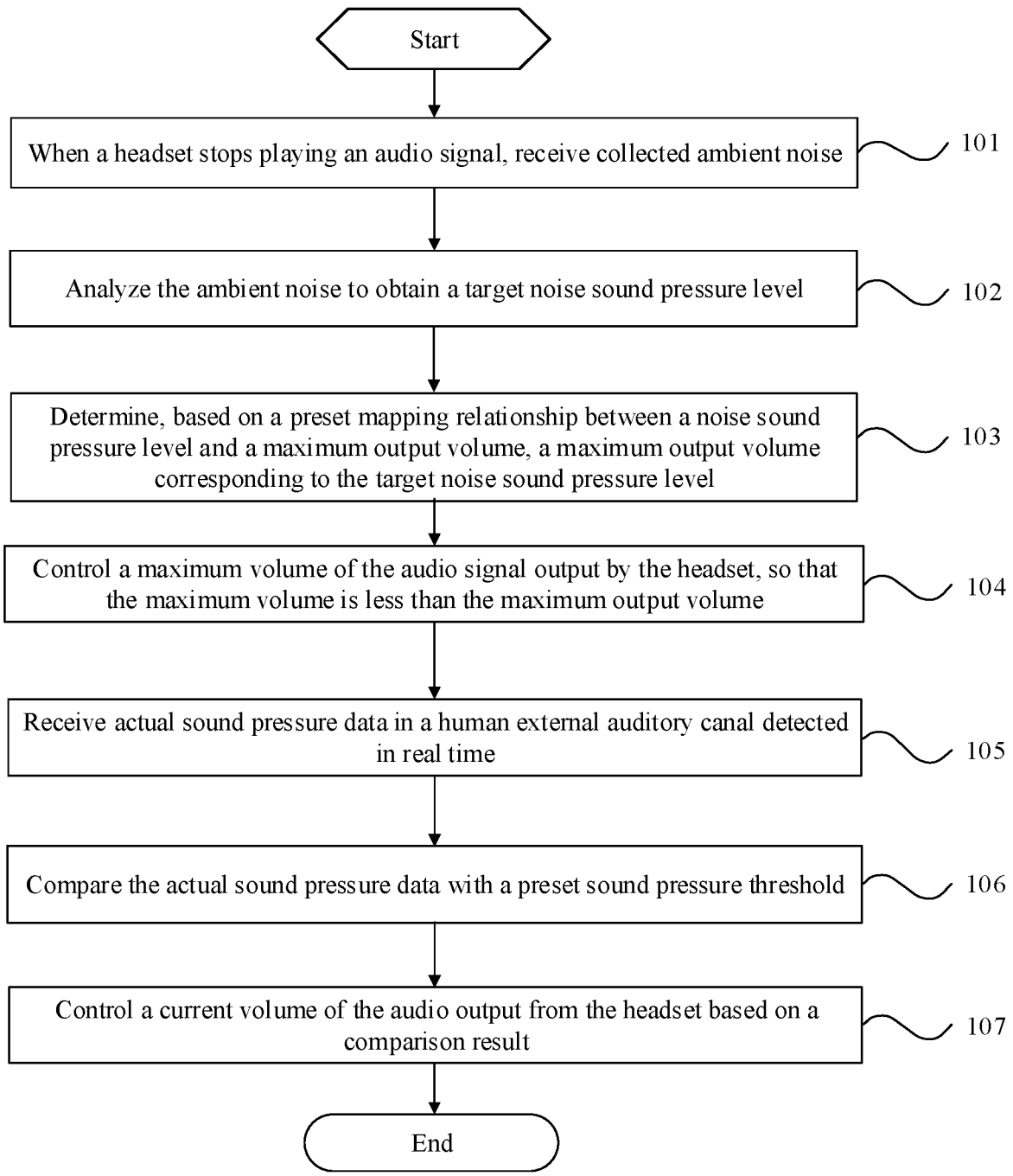
FIG. 1 is a flowchart of a human ear hearing protection method in the prior art.

FIG. 1 is a flowchart of a human ear hearing protection method in the related art. The embodiments provides a human ear hearing protection method, and the method includes: when a headset stops playing an audio signal, receiving collected ambient noise; analyzing the ambient noise to obtain a target noise sound pressure level; determining, based on a preset mapping relationship between a noise sound pressure level and a maximum output volume, a maximum output volume corresponding to the target noise sound pressure level; controlling a maximum volume of the audio signal output by the headset, and the maximum volume is less than the maximum output volume; receiving actual sound pressure data in a human external auditory canal detected in real time; comparing the actual sound pressure data with a preset sound pressure threshold; and controlling a current volume of the audio output from the headset based on a comparison result. In this embodiment of the present disclosure, the ambient noise and the actual output volume of the headset can be combined to control the output volume of the headset in real time, and the output volume of the headset can protect human ear hearing, without causing any impairment or affecting audio listening experience.

However, the foregoing solution has the following problems:

(1) In this solution, to collect a sound in an external auditory canal, a sound pressure sensor needs to be added to a headset cavity, which is incompatible with a conventional headset and increases hardware costs.

(2) In this solution, at least two microphones need to be disposed on the headset. However, a 3.5 mm headset interface of a current electronic device supports obtaining of data of only one microphone. Therefore, the data transmission interface and protocol of a 3.5 mm headset on a current electronic device do not meet a requirement of the foregoing solution, and a new transmission interface and protocol need to be defined and implemented.

(3) The sound pressure detected in the headset cavity is significantly different from the sound pressure actually heard by the user at the eardrum, and accuracy of representing the sound pressure actually heard by the user is relatively poor.

(4) This solution only provides hearing protection when the instantaneous sound pressure that the user hears when listening to music exceeds a standard, but does not protect the cumulative hearing impairment effect caused by the user's long-term use of the headset.

This application provides a user hearing protection method. The method can protect a user's hearing, without adding a hardware component of an existing electronic device, when the user's hearing is impaired because of over-standard instantaneous sound pressure in a scenario in which the user uses a headset to listen to music, watch a video, listen to a book, listen to the radio, play a game, and/or make a call, or the like, or when hearing impairment is accumulated because the user uses a headset for a long time.

Figure 2:
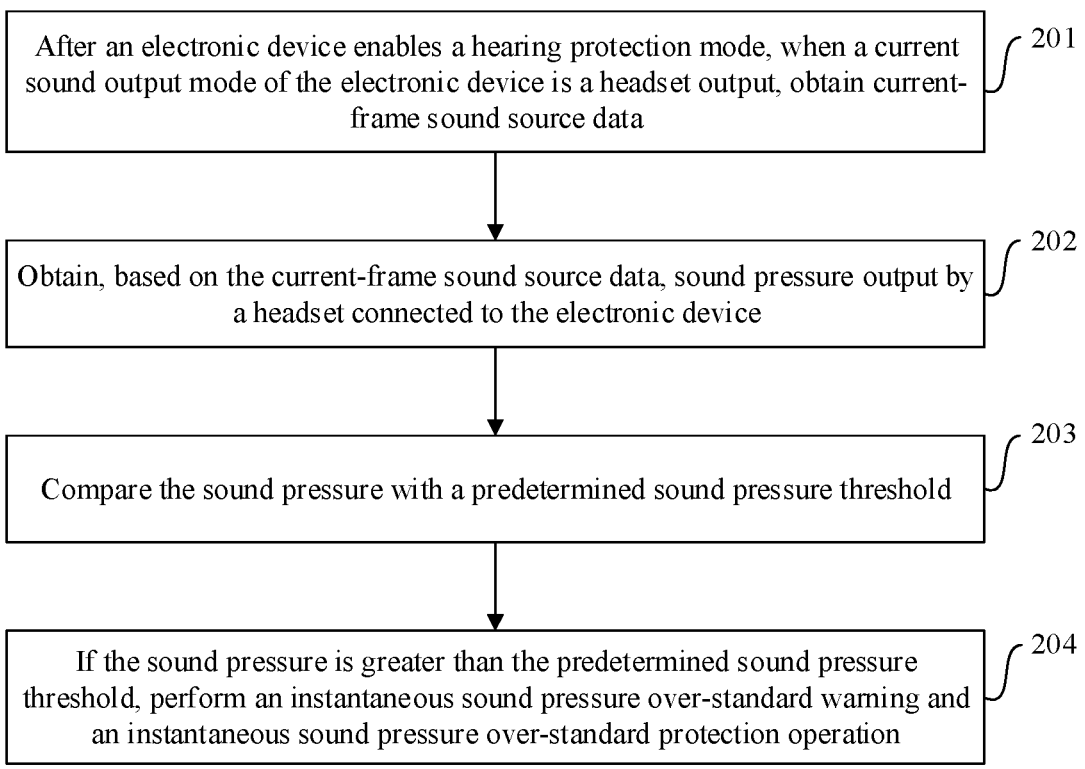
FIG. 2 is a flowchart of an embodiment of a user hearing protection method according to this application.

FIG. 2 is a flowchart of an embodiment of a user hearing protection method according to this application. As shown in FIG. 2, the foregoing user hearing protection method may include the following steps:

Step 201: After an electronic device enables a hearing protection mode, when a current sound output mode of the electronic device is a headset output, obtain current-frame sound source data.

In one embodiment, the electronic device may obtain the current sound output mode based on a current register or parameter data of an audio channel. If the current sound output mode of the electronic device is a speaker or a headset, the electronic device automatically disables the hearing protection function and prompts a user that the current sound output mode is a non-headset mode; or if the current sound output mode of the electronic device is the headset output, the electronic device normally switches to the hearing protection mode to obtain the current-frame sound source data.

Step 202: Obtain, based on the current-frame sound source data, sound pressure output by a headset connected to the electronic device.

That is, in this embodiment, the sound pressure output from the headset connected to the electronic device may be obtained based on the current-frame sound source data. No sound pressure sensor needs to be added to the headset cavity, and no headset data transmission interface or protocol needs to be changed.

The headset connected to the electronic device may be a headset connected to the electronic device by using a headset cable, or may be a Bluetooth headset connected to the electronic device by using Bluetooth. A specific form of the headset connected to the electronic device is not limited in this embodiment.

Step 203: Compare the sound pressure with a predetermined sound pressure threshold.

In specific implementation, the predetermined sound pressure threshold may be set based on system performance, an implementation requirement, or the like. This embodiment imposes no limitation on a value of the predetermined sound pressure threshold.

Step 204: If the sound pressure is greater than the predetermined sound pressure threshold, perform an instantaneous sound pressure over-standard warning and an instantaneous sound pressure over-standard protection operation.

The instantaneous sound pressure over-standard protection operation may be preset by a user of the electronic device. The instantaneous sound pressure over-standard protection operation may include: disabling play, reducing volume, or another operation set by the user. This embodiment imposes no limitation on a specific operation of the instantaneous sound pressure over-standard protection operation.

That is, when the sound pressure is greater than the predetermined sound pressure threshold, the electronic device performs an instantaneous sound pressure over-standard warning, and performs, on the electronic device and based on the operation preset by the user, an operation such as disabling play, reducing volume, or another possible set by the user.

In the foregoing user hearing protection method, after the electronic device enables the hearing protection mode, when the current sound output mode of the electronic device is output by the headset, the current-frame sound source data is obtained; the sound pressure output by the headset connected to the electronic device is obtained based on the current-frame sound source data; the sound pressure is compared with a predetermined sound pressure threshold; if the sound pressure is greater than the predetermined sound pressure threshold, the instantaneous sound pressure over-standard warning is performed on the electronic device, and the instantaneous sound pressure over-standard protection operation is performed on the electronic device. In this way, the user's hearing can be protected when the instantaneous sound pressure exceeds a standard in scenarios in which the user uses the headset to listen to music, watch a video, listen to a book, listen to the radio, play a game, make a call, or the like.

Figure 3:
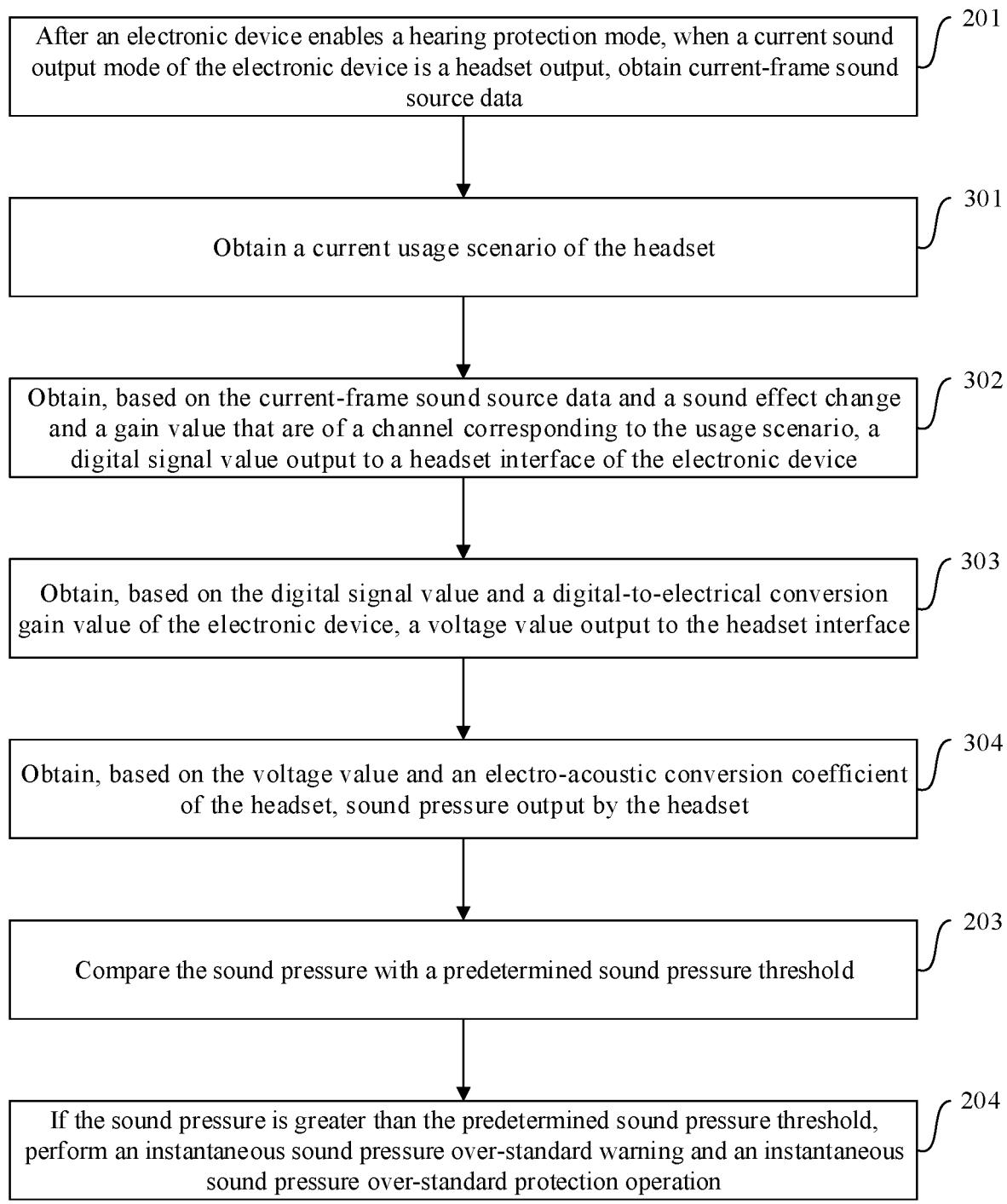
FIG. 3 is a flowchart of still another embodiment of a user hearing protection method according to this application.

FIG. 3 is a flowchart of still another embodiment of a user hearing protection method according to this application. As shown in FIG. 3, in the embodiment shown in FIG. 2 of this application, step 202 may include the following steps:

Step 301: Obtain a current usage scenario of a headset.

The current usage scenario of the headset may include: audio play, video play, gaming, making a call, or the like.

Step 302: Obtain, based on current-frame sound source data and a sound effect change and a gain value that are of a channel corresponding to the usage scenario, a digital signal value output to a headset interface of an electronic device.

Step 303: Obtain, based on the digital signal value and a digital-to-electrical conversion gain value of the electronic device, a voltage value output to the headset interface.

Step 304: Obtain, based on the voltage value and an electro-acoustic conversion coefficient of the headset, sound pressure output by the headset.

In one embodiment, before the obtaining, based on the voltage value and an electro-acoustic conversion coefficient of the headset, sound pressure output by the headset, the method further includes: after the electronic device plays unique voice source data, obtaining electrical signal time domain data at a headset interface of the electronic device, and obtaining acoustic signal time domain data output by the headset; and obtaining the electro-acoustic conversion coefficient of the headset based on the electrical signal time domain data and the acoustic signal time domain data.

Figure 4:
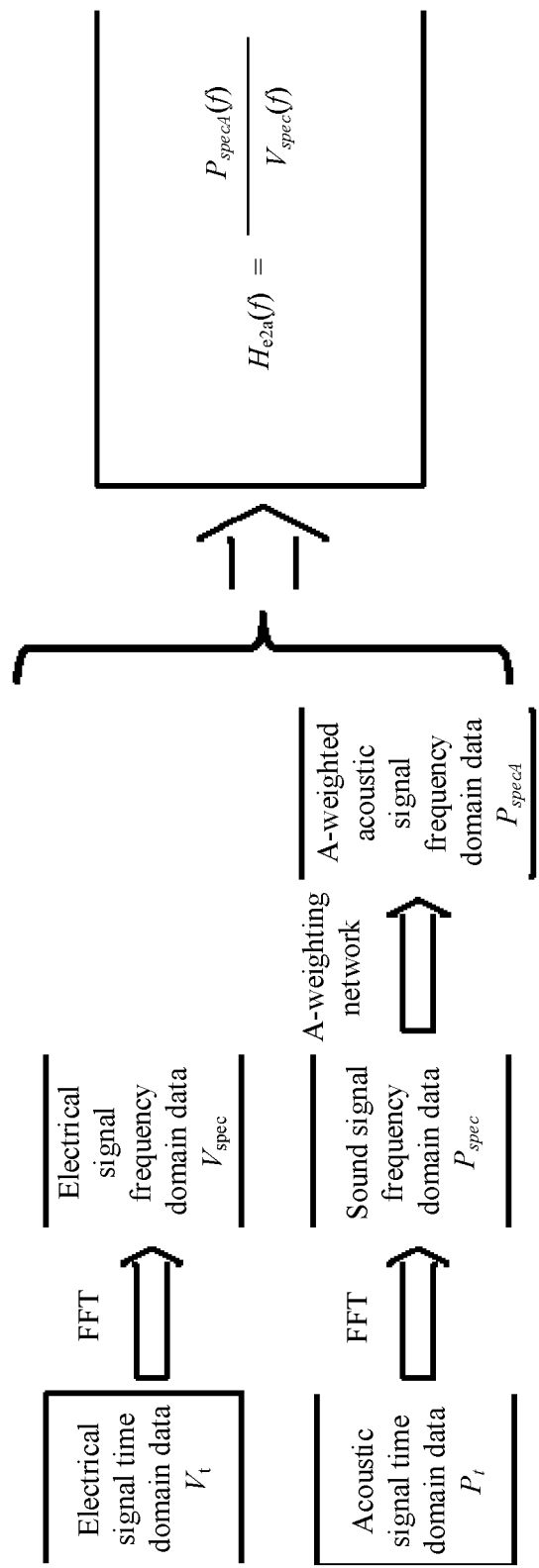
FIG. 4 is a schematic diagram of an embodiment of obtaining an electro-acoustic conversion coefficient in a user hearing protection method according to this application.

In one embodiment, FIG. 4 is a schematic diagram of an embodiment of obtaining an electro-acoustic conversion coefficient in a user hearing protection method according to this application. As shown in FIG. 4, after an electronic device plays unique audio source data, a voltage measurement device may be used to obtain electrical signal time domain data $V_t$ at a headset interface of the electronic device, and an artificial head test is performed to obtain acoustic signal time domain data $P_t$ output by the headset; then Fast Fourier Transform (fast fourier transform, hereinafter referred to as fft) is separately performed on $V_t$ and $P_t$ to obtain electrical signal frequency domain data $V_{spec}$ and acoustic signal time domain data $P_{spec}$; then the acoustic signal frequency domain data $P_{spec}$ is converted into A-weighted acoustic signal frequency domain data $P_{specA}$ by using an A-weighting network; and finally, a ratio of the A-weighted acoustic signal frequency domain data $P_{specA}$ to the electrical signal frequency domain data $V_{spec}$ is calculated. The ratio is an electro-acoustic conversion coefficient $H_{e2a}(f)$.

In this embodiment, a headset matched with an electronic device is tested by using a head and torso simulator to obtain an electro-acoustic transfer function of the headset. The transfer function represents an accurate value of an electrical signal (output by the electronic device) received by the headset to an ear membrane simulation position (a sound pressure sensor is disposed in an ear of the head and torso simulator), and precision is relatively high.

In this way, the obtaining, based on the voltage value and an electro-acoustic conversion coefficient of the headset, sound pressure output by the headset may be as follows: converting the voltage value into electrical signal frequency domain data; obtaining acoustic signal frequency domain data based on the electrical signal frequency domain data and the electro-acoustic conversion coefficient; converting the acoustic signal frequency domain data into acoustic signal time domain data; and obtaining, based on the acoustic signal time domain data, the sound pressure output by the headset.

Figure 5:
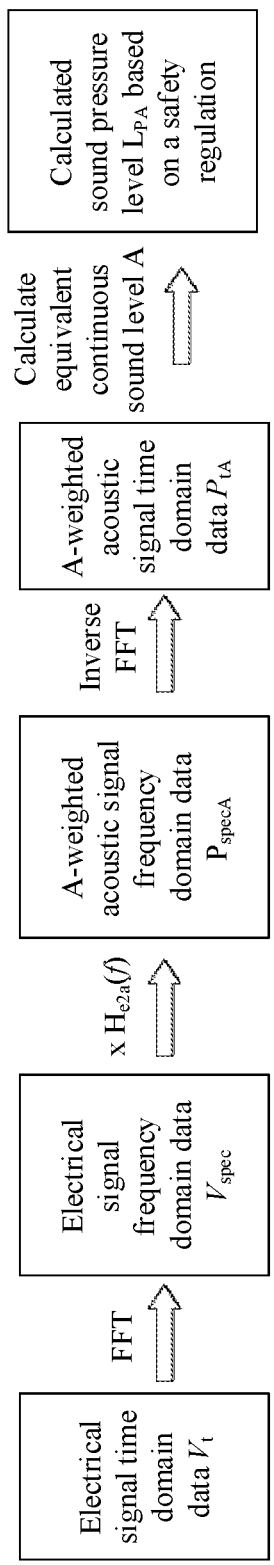
FIG. 5 is a schematic diagram of an embodiment of obtaining sound pressure in a user hearing protection method according to this application.

In one embodiment, FIG. 5 is a schematic diagram of an embodiment of obtaining sound pressure in a user hearing protection method according to this application. As shown in FIG. 5, an FFT may be performed on the voltage value (that is, the electrical signal time domain data $V_t$), to convert the voltage value into the electrical signal frequency domain data $V_{spec}$; then the electrical signal frequency domain data $V_{spec}$ is multiplied by the electrical acoustic conversion coefficient $H_{e2a}(f)$ to obtain the time domain data $P_{tA}$ of the A-weighted acoustic signal; and finally, equivalent continuous sound level A is calculated based on the A-weighted acoustic signal time domain data $P_{tA}$ to obtain a calculated sound pressure level $L_{PA}$.

In this embodiment, the sound pressure output from the headset connected to the electronic device may be obtained based on the current-frame sound source data, which is completely implemented by using software. No sound pressure sensor needs to be added to the headset cavity, and no headset data transmission interface or protocol needs to be changed.

Figure 6:
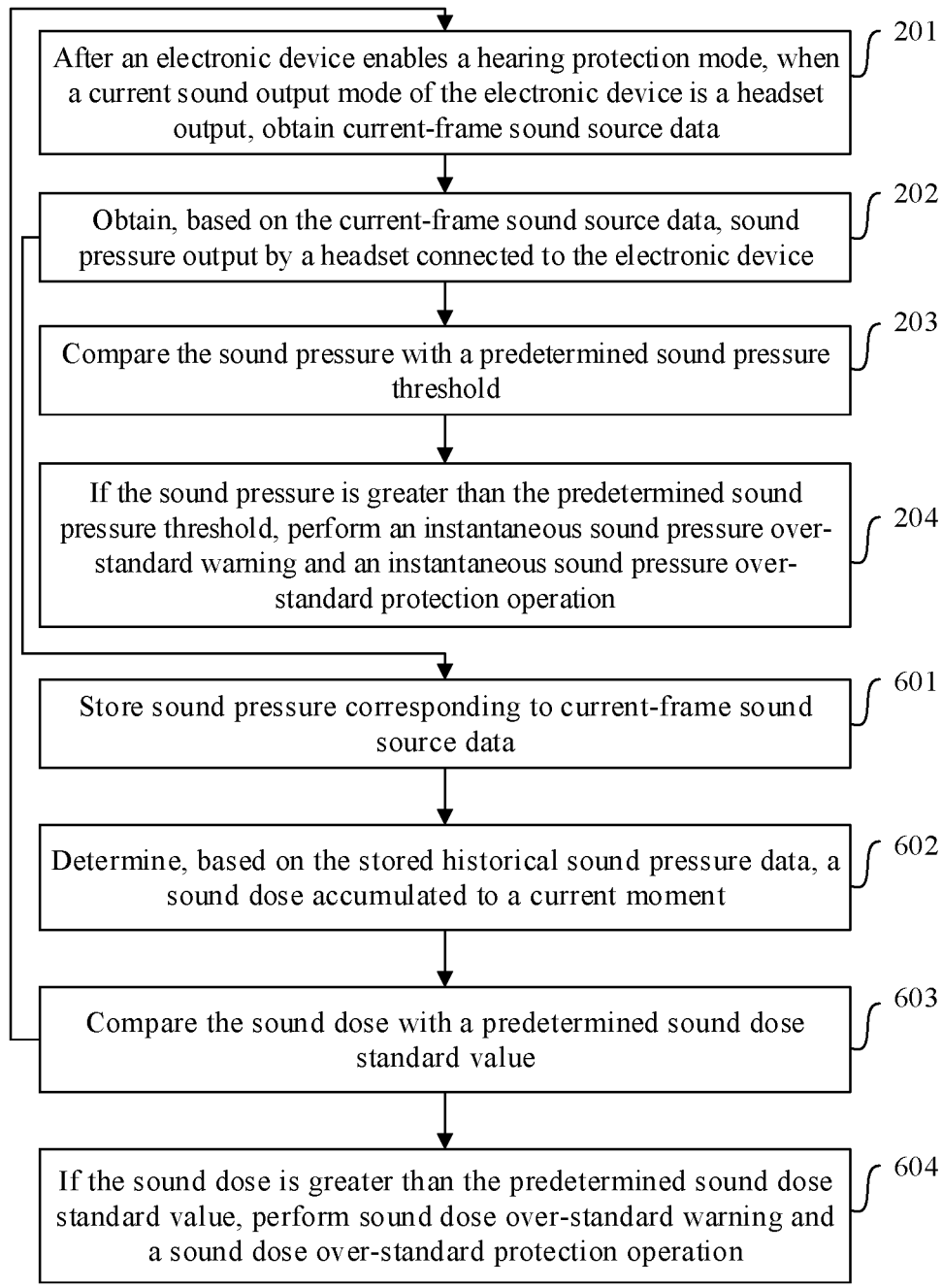
FIG. 6 is a flowchart of still another embodiment of a user hearing protection method according to this application.

FIG. 6 is a flowchart of still another embodiment of a user hearing protection method according to this application. As shown in FIG. 6, in the embodiment shown in FIG. 2 of this application, after step 202, the following steps may be further included:

Step 601: Store sound pressure corresponding to current-frame sound source data.

In one embodiment, the sound pressure corresponding to the current-frame sound source data may be stored in a memory.

Step 602: Determine, based on the stored historical sound pressure data, a sound dose accumulated to a current moment.

In one embodiment, the sound dose accumulated to the current moment may be calculated based on the historical sound pressure data stored in the memory and a sound dose calculation method.

Step 603: Compare the sound dose with a predetermined sound dose standard value.

The predetermined sound dose standard value may be a sound dose standard value specified in an international standard or a domestic standard, or may be a user-defined sound dose standard value.

Step 604: If the sound dose is greater than the predetermined sound dose standard value, perform sound dose over-standard warning and a sound dose over-standard protection operation.

The sound dose over-standard protection operation may be preset by a user of the electronic device, and the sound dose over-standard protection operation may include: reminding the user to pause using the headset mode to avoid hearing impairment, recommending the user to rest for X hours before using the headset mode, and performing an operation such as disabling play, reducing volume, or another possible set by the user.

Further, after step 603, if the sound dose is less than or equal to the predetermined sound dose standard value, or the sound dose is greater than the predetermined sound dose standard value, but the user forces the electronic device to continue play, the electronic device continues to play the next frame of sound source data, and returns to step 201; or if the sound dose is greater than the predetermined sound dose standard value and the user chooses to disable play, this procedure ends. In addition, when the user removes the headset or disables play after normally using the terminal device, the hearing protection mode automatically exits.

This embodiment implements early warning and hearing protection for a user when a total sound dose exceeds a standard after music is listened continuously for a long time.

Figure 7:
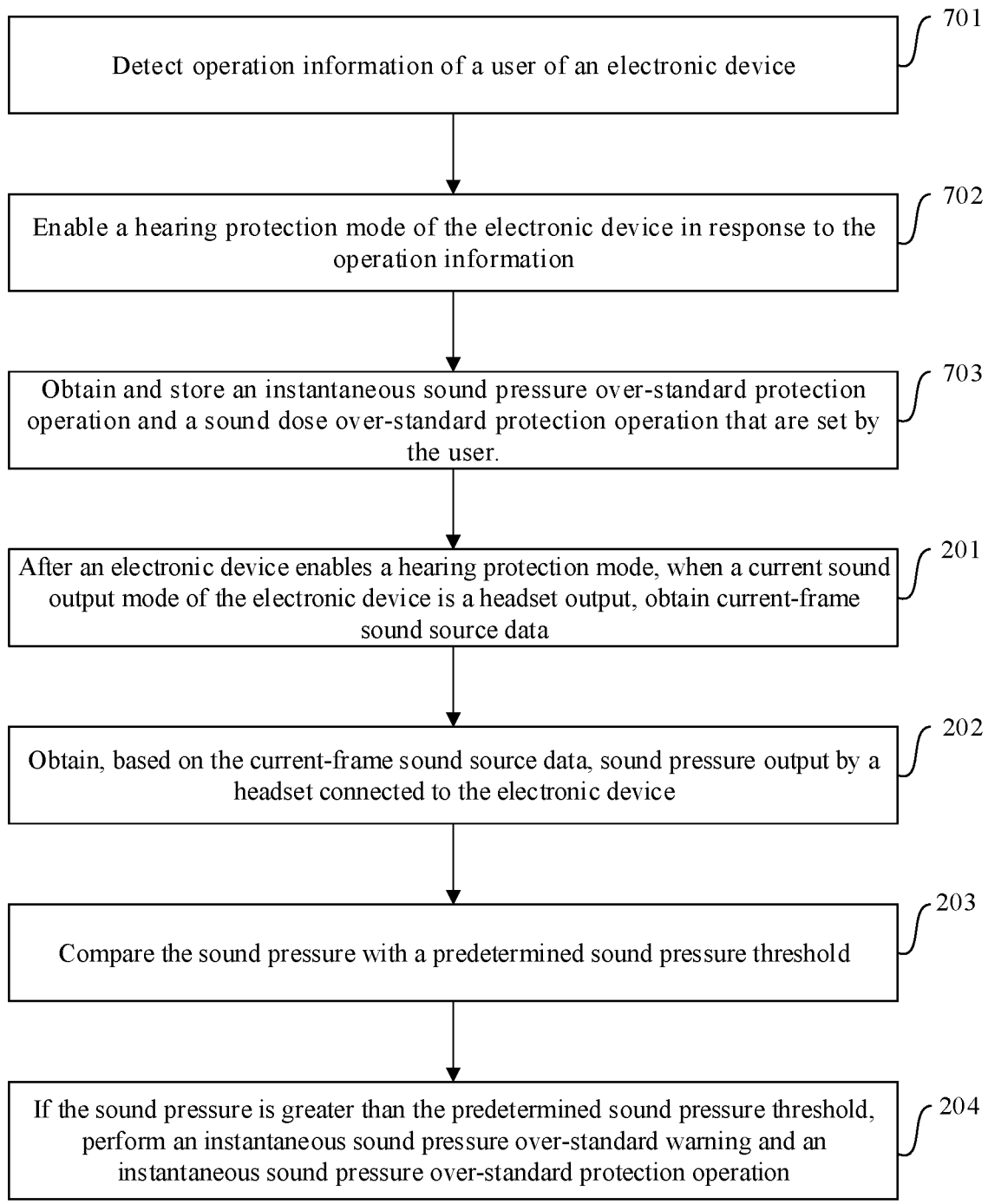
FIG. 7 is a flowchart of still another embodiment of a user hearing protection method according to this application.

FIG. 7 is a flowchart of still another embodiment of a user hearing protection method according to this application. As shown in FIG. 7, in the embodiment shown in FIG. 2 of this application, before step 201, the following steps may be further included:

Step 701: Detect operation information of a user of an electronic device.

The operation information may include: The user performs a tap, a long press, or another operation on an interface of the electronic device; or the operation information may include operation information entered by the user to the electronic device by using a voice.

Step 702: Enable a hearing protection mode of the electronic device in response to the operation information.

That is, in specific implementation, the electronic device may detect a tap, a long press, or another operation performed by the user on the interface of the electronic device, or operation information entered by the user by using a voice, and then enable the hearing protection mode of the electronic device in response to the operation information.

Step 703: Obtain and store an instantaneous sound pressure over-standard protection operation and a sound dose over-standard protection operation that are set by the user.

In one embodiment, after the electronic device enables the hearing protection mode, the electronic device may obtain and store the instantaneous sound pressure over-standard protection operation and the sound dose over-standard protection operation that are set by the user.

The instantaneous sound pressure over-standard protection operation may include: disabling play, reducing volume, or another operation set by the user. This embodiment imposes no limitation on a specific operation of the instantaneous sound pressure over-standard protection operation.

The sound dose over-standard protection operation may include: reminding the user to pause using the headset mode to avoid hearing impairment, recommending the user to rest for X hours before using the headset mode, and performing an operation such as disabling play, reducing volume, or another possible set by the user.

The user hearing protection method provided in this application may be applied to an electronic device including a headset. The method can protect a user's hearing, without adding a hardware component of an existing electronic device, when the user's hearing is impaired because of over-standard instantaneous sound pressure in a scenario in which the user uses a headset to listen to music, watch a video, listen to a book, listen to the radio, play a game, and/or make a call, or when hearing impairment is accumulated because the user uses a headset for a long time.

The following uses a music play mode on an electronic device as an example to describe the user hearing protection method provided in this application. However, this embodiment of this application is not limited thereto, and is applied to any scenario in which a headset is used to watch a video, listen to a book, play a game, or make a call.

FIG. 8(a)(1)-FIG. 8(a)(2) are a flowchart of still another embodiment of a user hearing protection method according to this application. As shown in FIG. 8(a)(1)-FIG. 8(a)(2), the foregoing user hearing protection method may include the following steps:

Step 801: An electronic device enables a hearing protection mode.

In one embodiment, the electronic device may detect a tap, a long press, or another operation performed by a user of the electronic device on an interface of the electronic device, or operation information entered by the user by using a voice, and then enable the hearing protection mode of the electronic device in response to the operation information.

After the electronic device enables the hearing protection mode, the electronic device may obtain and store an instantaneous sound pressure over-standard protection operation and a sound dose over-standard protection operation that are set by the user.

The instantaneous sound pressure over-standard protection operation may include: disabling play, reducing volume, or another operation set by the user. This embodiment imposes no limitation on a specific operation of the instantaneous sound pressure over-standard protection operation.

The sound dose over-standard protection operation may include: reminding the user to pause using the headset mode to avoid hearing impairment, recommending the user to rest for X hours before using the headset mode, and performing an operation such as disabling play, reducing volume, or another possible set by the user.

Step 802: Obtain a current sound output mode of the electronic device.

In one embodiment, the electronic device may obtain the current sound output mode based on a current register or parameter data of an audio channel. If the current sound output mode of the electronic device is a speaker or a headset, the electronic device automatically disables the hearing protection function and prompts a user that the current sound output mode is a non-headset mode; or if the current sound output mode of the electronic device is a headset output, the electronic device normally switches to the hearing protection mode to obtain current-frame sound source data.

Step 803: Obtain the current-frame sound source data.

In one embodiment, the electronic device may obtain, based on a frame length T preconfigured by an algorithm, one frame of sound source data as an input for analysis.

Step 804: Obtain, based on the current-frame sound source data, sound pressure output by a headset connected to the electronic device.

In one embodiment, FIG. 8(b) is a flowchart of an embodiment of obtaining sound pressure output by a headset in a user hearing protection method according to this application. As shown in FIG. 8(b), step 804 may include the following steps:

Step 8041: After obtaining one frame of sound source data A, first obtain a current usage scenario of the headset, read a volume level parameter set by the electronic device in the current usage scenario, and obtain a volume gain value $C_1$ based on a currently used volume to obtain sound source data $A*C_1$.

Step 8042: Read the sound effect parameter in the current usage scenario, and perform a sound effect operation on the input sound source data $A*C_1$ to obtain output data Eff$(A*C_1)$.

Step 8043: Read a post gain $C_2$, and perform a gain operation to obtain an output Eff$(A*C_1)*C_2$.

Step 8044: An audio codec (Codec) adds a gain $C_3$ to the digital signal input Eff$(A*C_1)*C_2$ to obtain an output Eff$(A*C_1)*C_2*C_3$, where Eff$(A*C_1)*C_2*C_3$ is a digital signal value output to the headset interface of the electronic device.

Step 8045: Multiply Eff$(A*C_1)*C_2*C_3$ by an output a digital-to-electrical conversion gain value $C_{ce}$ (predetermined through test) that is output by the codec to the headset, to obtain a voltage value Eff$(A*C_1)*C_2*C_3*C_{ce}$ that is output to the headset interface.

Step 8046: Obtain, based on the voltage value and the electro-acoustic conversion coefficient $H_{e2a}(f)$ of the headset, a sound pressure $p_4=[\text{Eff}(A*C_1)*C_2*C_3*C_{ce}]H_{e2a}$ output by the headset connected to the electronic device, where  represents frequency domain multiplication.

Step 805: Compare the sound pressure output by the headset connected to the electronic device with a predetermined sound pressure threshold. If the sound pressure is greater than the predetermined sound pressure threshold, step 806 is performed; or if the sound pressure is less than or equal to the predetermined sound pressure threshold, step 807 is performed.

Step 806: Perform an instantaneous sound pressure over-standard warning and an instantaneous sound pressure over-standard protection operation. Then, step 807 is performed.

The instantaneous sound pressure over-standard protection operation may be preset by a user of the electronic device. The instantaneous sound pressure over-standard protection operation may include: disabling music play, reducing volume, or another operation set by the user. This embodiment imposes no limitation on a specific operation of the instantaneous sound pressure over-standard protection operation.

Step 807: Store current sound pressure data.

In one embodiment, the current sound pressure data is stored in a memory as historical data.

Step 808: Determine, based on the stored historical sound pressure data, a sound dose accumulated to a current moment.

In one embodiment, the sound dose accumulated to the current moment may be calculated based on the historical sound pressure data stored in the memory and a sound dose calculation method.

Step 809: Compare the sound dose with a predetermined sound dose standard value. Then, step 810 is performed.

The predetermined sound dose standard value may be a sound dose standard value specified in an international standard or a domestic standard, or may be a user-defined sound dose standard value.

Step 810: If the sound dose is greater than the predetermined sound dose standard value, perform sound dose over-standard warning and a sound dose over-standard protection operation.

The sound dose over-standard protection operation may be preset by a user of the electronic device, and the sound dose over-standard protection operation may include: reminding the user to pause using the headset mode to avoid hearing impairment, recommending the user to rest for X hours before using the headset to listen to music, and performing an operation such as disabling play, reducing volume, or another possible set by the user.

Further, after step 809, if the sound dose is less than or equal to the predetermined sound dose standard value, or the sound dose is greater than the predetermined sound dose standard value, but the user forces the electronic device to continue play, the electronic device continues to play the next frame of sound source data, and returns to step 801; or if the sound dose is greater than the predetermined sound dose standard value and the user chooses to disable music play, this procedure ends. In addition, when the user removes the headset or disables play after normally using the terminal device, the hearing protection mode automatically exits.

It may be understood that some or all of the steps or operations in the foregoing embodiment are merely examples. In this embodiment of this application, other operations or variations of various operations may also be performed. In addition, the steps may be performed in an order different than the order presented in the foregoing embodiment, and it may not be necessary to perform all the operations in the foregoing embodiment.

The user hearing protection method provided in this embodiment of this application may be slightly modified to estimate the sound pressure distribution of the spatial sound field when a mobile phone, a smart sound box, or a smart large screen uses a speaker device to play music or a video. A difference is that, in this embodiment of this application, a headset is used, and an electro-acoustic conversion coefficient between an electrical signal output by the electronic device and sound pressure output by the headset needs to be established. However, when a mobile phone, a smart sound box, or a smart large screen uses a speaker device for playing, to estimate an external sound field, an electro-acoustic conversion coefficient between an electrical signal and each point in the external sound field space needs to be established.

Figure 9:
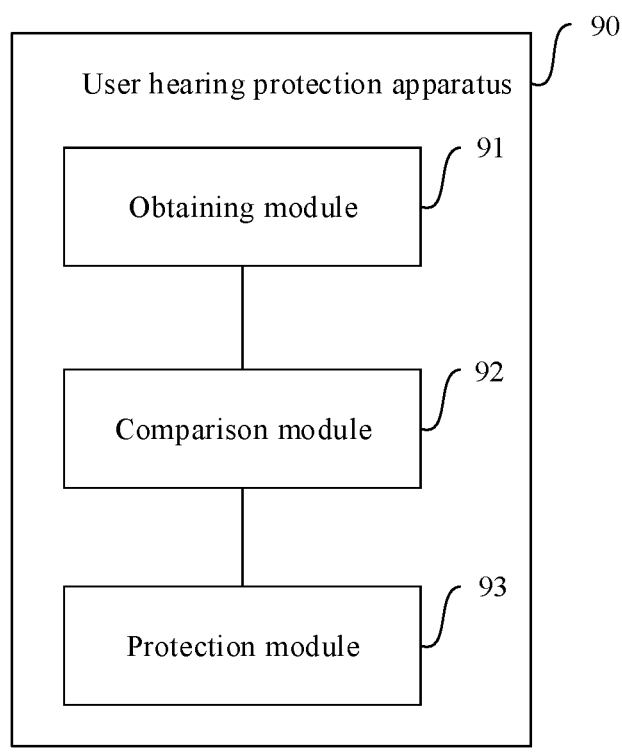
FIG. 9 is a schematic structural diagram of an embodiment of a user hearing protection apparatus according to this application.

FIG. 9 is a schematic structural diagram of an embodiment of a user hearing protection apparatus according to this application. As shown in FIG. 6, the user hearing protection apparatus 90 may include: an obtaining module 91, a comparison module 92, and a protection module 93. It should be understood that the user hearing protection apparatus 90 may be corresponding to an electronic device 900 shown in FIG. 11. Functions of the obtaining module 91, the comparison module 92, and the protection module 93 may be implemented by a processor 910 in the electronic device 900 shown in FIG. 11.

The obtaining module 91 is configured to: after the electronic device enables a hearing protection mode, when a current sound output mode of the electronic device is a headset output, obtain current-frame sound source data; and obtain, based on the current-frame sound source data, the sound pressure output by the headset connected to the electronic device.

The comparison module 92 is configured to the sound pressure with a predetermined sound pressure threshold.

The protection module 93 is configured to: if the sound dose is greater than the predetermined sound dose standard value, perform sound dose over-standard warning and a sound dose over-standard protection operation.

The user hearing protection apparatus 90 provided in the embodiment shown in FIG. 9 may be configured to execute the method embodiment shown in FIG. 2 of this application. For implementation principles and effects of the apparatus 90, refer to related descriptions in the method embodiment.

Figure 10:
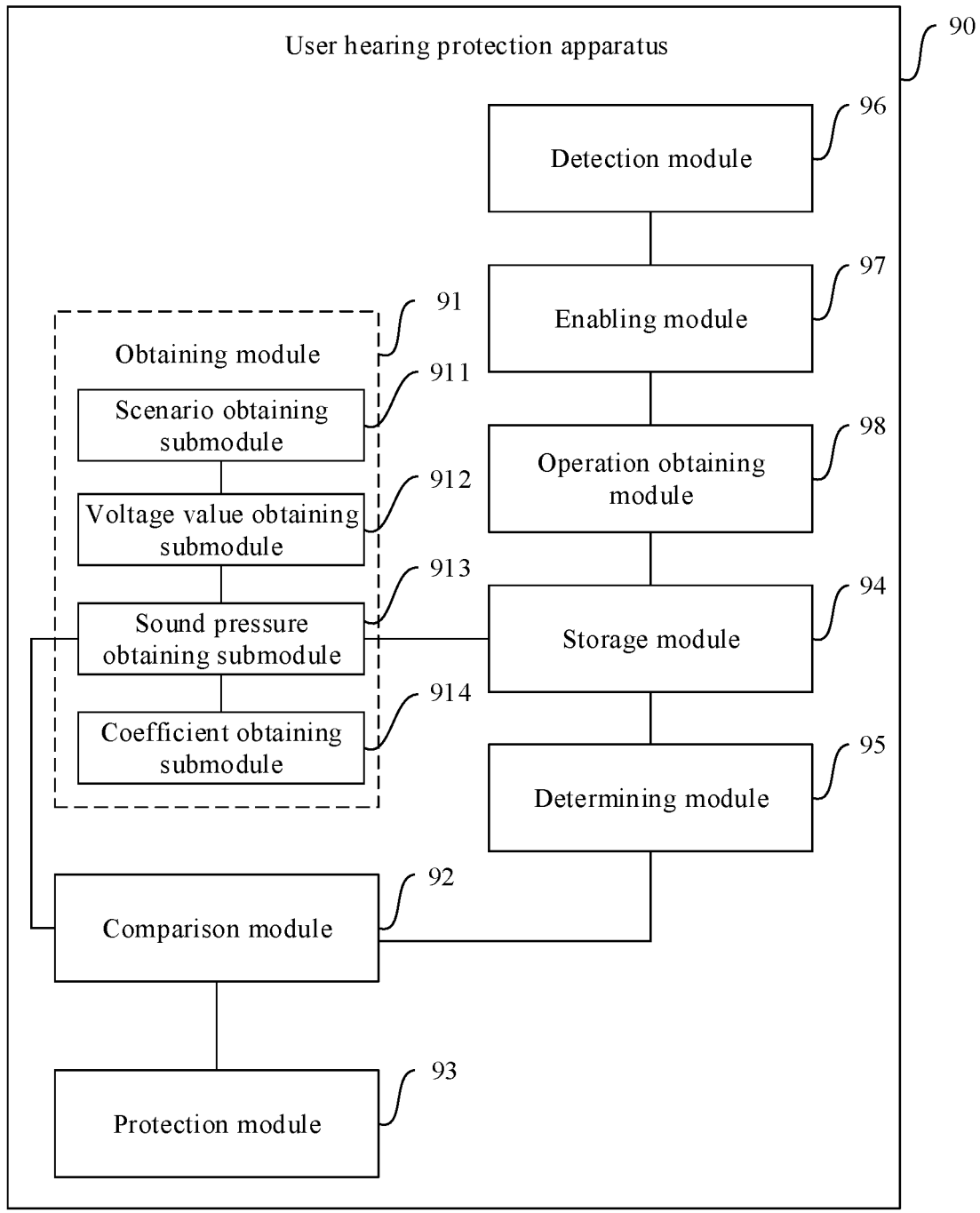
FIG. 10 is a schematic structural diagram of another embodiment of a user hearing protection apparatus according to this application.

FIG. 10 is a schematic structural diagram of another embodiment of a user hearing protection apparatus according to this application. Compared with the user hearing protection apparatus 90 shown in FIG. 9, a difference lies in that in a user hearing protection apparatus 100 shown in FIG. 10, an obtaining module 91 may include a scenario obtaining submodule 911, a voltage value obtaining submodule 912, and a sound pressure obtaining submodule 913.

The scenario obtaining submodule 911 is configured to obtain a current usage scenario of the headset.

The voltage value obtaining submodule 912 is configured to obtain, based on the current-frame sound source data and a sound effect change and a gain value that are of a channel corresponding to the usage scenario, a digital signal value output to a headset interface of the electronic device; and obtain, based on the digital signal value and a digital-to-electrical conversion gain value of the electronic device, a voltage value output to the headset interface.

The sound pressure obtaining submodule 913 is configured to obtain, based on the voltage value and an electro-acoustic conversion coefficient of the headset, sound pressure output by the headset.

In a possible implementation, the user hearing protection apparatus 100 may further include: a storage module 94 and a determining module 95.

The storage module 94 is configured to: after the obtaining module 91 obtains the sound pressure output by the headset connected to the electronic device, store the sound pressure corresponding to the current-frame sound source data.

The determining module 95 is configured to determine, based on the stored historical sound pressure data, a sound dose accumulated to a current moment.

The comparison module 92 is further configured to compare the sound dose with a predetermined sound dose standard value.

The protection module 93 is further configured to: when the sound dose is greater than the predetermined sound dose standard value, perform sound dose over-standard warning and a sound dose over-standard protection operation.

In a possible implementation, the user hearing protection apparatus 100 may further include: a detection module 96, an enabling module 97, an operation obtaining module 98, and a storage module 94.

The detection module 96 is configured to: before the obtaining module 91 obtains the current-frame sound source data, detect operation information of a user of an electronic device.

The enabling module 97 is configured to enable a hearing protection mode of the electronic device in response to the operation information detected by the detection module 96.

The operation obtaining module 98 is further configured to obtain an instantaneous sound pressure over-standard protection operation and a sound dose over-standard protection operation that are set by the user.

The storage module 94 is configured to store the instantaneous sound pressure over-standard protection operation and the sound dose over-standard protection operation that are obtained by the obtaining module 91.

In a possible implementation, the obtaining module 91 may further include: a coefficient obtaining submodule 914.

The coefficient obtaining submodule 914 is configured to: before the sound pressure obtaining submodule 913 obtains the sound pressure output by the headset, and after the electronic device plays unique sound source data, obtain electrical signal time domain data at a headset interface of the electronic device, and obtain acoustic signal time domain data output by the headset; and obtain an electroacoustic conversion coefficient of the headset based on the electrical signal time domain data and the acoustic signal time domain data.

In a possible implementation, the sound pressure obtaining submodule 913 is configured to: convert the voltage value into electrical signal frequency domain data, and obtain acoustic signal frequency domain data based on the electrical signal frequency domain data and the electroacoustic conversion coefficient; and convert the acoustic signal frequency domain data into acoustic signal time domain data, and obtain, based on the acoustic signal time domain data, the sound pressure output by the headset.

Figure 11:
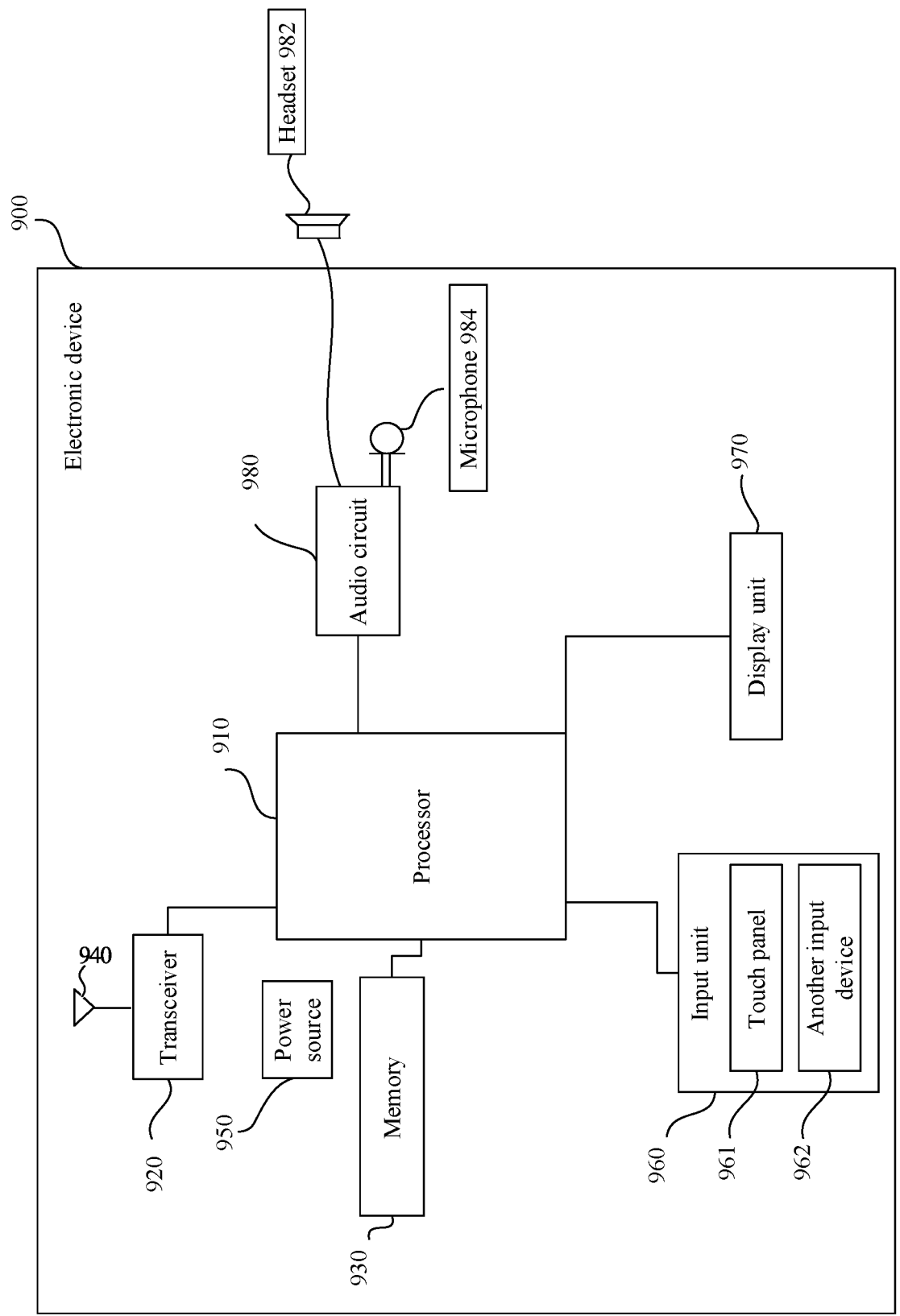
FIG. 11 is a schematic structural diagram of an embodiment of an electronic device according to this application.

It should be understood that the user hearing protection apparatus 100 may be corresponding to the electronic device 900 shown in FIG. 11. Functions of the obtaining module 91, the comparison module 92, the protection module 93, the storage module 94, the determining module 95, and the enabling module 97 may be implemented by the processor 910 in the electronic device 900 shown in FIG. 11, and functions of the enabling module 97 may be implemented by an input unit 960 in the electronic device 900 shown in FIG. 11.

The user hearing protection apparatus 100 provided in the embodiment shown in FIG. 10 may be configured to execute the method embodiments shown in FIG. 3 to FIG. 7 of this specification. For implementation principles and effects of the apparatus 100, refer to related descriptions in the method embodiments.

It should be understood that the division of the modules of the user hearing protection apparatuses shown in FIG. 9 and FIG. 10 is merely logical function division. In actual implementation, all or some of the modules may be integrated into one physical entity, or may be physically separated. In addition, all the modules may be implemented by software invoked by a processing element, or may be implemented by hardware; or some modules may be implemented by software invoked by a processing element, and some modules are implemented by hardware. For example, the protection module may be a separately disposed processing element, or may be integrated into a chip of the electronic device for implementation. The implementation of the other modules is similar. In addition, all or some of these modules may be integrated together, or may be implemented independently. In an implementation process, the steps in the foregoing methods or the foregoing modules may be implemented by using an integrated logical circuit of hardware in the processor element or an instruction in a form of software.

For example, the foregoing modules may be one or more integrated circuits configured to implement the foregoing methods, for example, one or more application specific integrated circuits (Application Specific Integrated Circuit, hereinafter referred to as ASIC), one or more digital signal processors (Digital Signal Processor, hereinafter referred to as DSP), or one or more field programmable gate arrays (Field Programmable Gate Array, hereinafter referred to as FPGA). For another example, these modules may be integrated together, and implemented in a form of a System-On-a-Chip (System-On-a-Chip, hereinafter referred to as SOC).

FIG. 11 is a schematic structural diagram of an embodiment of an electronic device according to this application. As shown in FIG. 11, the electronic device may include: a display unit; one or more processors; a memory; a single audio channel; an input unit; application programs; and one or more computer programs.

The electronic device may be a mobile terminal (mobile phone), a smart screen, a drone, and an Intelligent Connected Vehicle (Intelligent Connected Vehicle, hereinafter referred to as ICV), a smart/intelligent car (smart/intelligent car), an in-vehicle device, or the like.

The foregoing one or more computer programs are stored in the foregoing memory, and the foregoing one or more computer programs include an instruction. When the instruction is executed by the foregoing device, the device is enabled to perform the following steps: after the electronic device enables a hearing protection mode, when a current sound output mode of the electronic device is a headset output, obtaining current-frame sound source data;

obtaining, based on the current-frame sound source data, sound pressure output by a headset connected to the electronic device;

comparing the sound pressure with a predetermined sound pressure threshold; and if the sound pressure is greater than the predetermined sound pressure threshold, performing an instantaneous sound pressure over-standard warning and an instantaneous sound pressure over-standard protection operation.

In a possible implementation, when the instruction is executed by the device, that the device is enabled to perform the step of obtaining, based on the current-frame sound source data, sound pressure output by a headset connected to the electronic device includes:

obtaining a current usage scenario of the headset;

obtaining, based on the current-frame sound source data and a sound effect change and a gain value that are of a channel corresponding to the usage scenario, a digital signal value output to a headset interface of the electronic device;

obtaining, based on the digital signal value and a digital-to-electrical conversion gain value of the electronic device, a voltage value output to the headset interface; and obtaining, based on the voltage value and an electroacoustic conversion coefficient of the headset, sound pressure output by the headset.

In a possible implementation, when the instruction is executed by the device, after the device is enabled to perform the step of obtaining, based on the current-frame sound source data, sound pressure output by a headset connected to the electronic device, the following steps are further performed:

storing the sound pressure corresponding to the current-frame sound source data;

determining, based on the stored historical sound pressure data, a sound dose accumulated to a current moment;

comparing the sound dose with a predetermined sound dose standard value; and if the sound dose is greater than the predetermined sound dose standard value, performing sound dose over-standard warning and a sound dose over-standard protection operation.

In a possible implementation, when the instruction is executed by the device, before the device is enabled to perform the step of obtaining current-frame sound source data, the following steps are further performed:

detecting operation information of a user of an electronic device;

enabling a hearing protection mode of the electronic device in response to the operation information; and obtaining and storing the instantaneous sound pressure over-standard protection operation and the sound dose over-standard protection operation that are set by the user.

In a possible implementation, when the instruction is executed by the device, before the device is enabled to perform the step of obtaining, based on the voltage value and an electro-acoustic conversion coefficient of the headset, sound pressure output by the headset, the following steps are further performed:

after the electronic device plays unique voice source data, obtaining electrical signal time domain data at a headset interface of the electronic device, and obtaining acoustic signal time domain data output by the headset; and obtaining the electro-acoustic conversion coefficient of the headset based on the electrical signal time domain data and the acoustic signal time domain data.

In a possible implementation, when the instruction is executed by the device, that the device is enabled to perform the step of obtaining, based on the voltage value and an electro-acoustic conversion coefficient of the headset, sound pressure output by the headset includes:

converting the voltage value into electrical signal frequency domain data;

obtaining acoustic signal frequency domain data based on the electrical signal frequency domain data and the electro-acoustic conversion coefficient;

converting the acoustic signal frequency domain data into acoustic signal time domain data; and obtaining, based on the acoustic signal time domain data, the sound pressure output by the headset.

The electronic device shown in FIG. 11 may be a terminal device or a circuit device disposed in the terminal device. The device may be configured to perform functions/steps in the methods provided in the embodiments shown in FIG. 2 to FIG. 7 of this application.

As shown in FIG. 11, the electronic device 900 includes a processor 910 and a transceiver 920. In one embodiment, the electronic device 900 may further include a memory 930. The processor 910, the transceiver 920, and the memory 930 may communicate with each other by using an internal connection channel to transfer a control signal and/or a data signal. The memory 930 is configured to store a computer program, program code of a hearing protection algorithm, historical data of a hearing protection process, and user-defined data. The processor 910 is configured to invoke and run the computer program from the memory 930, process information transmitted by the input unit 960 and the display unit 970, and process an audio stream signal.

The memory 930 may be a read-only memory (read-only memory, ROM) or another type of static storage device that can store static information and instructions, a random access memory (random access memory, RAM) or another type of dynamic storage device that can store information and instructions, may be an electrically erasable programmable read-only memory (electrically erasable programmable read-only memory, EEPROM), a compact disc read-only memory (compact disc read-only memory, CD-ROM) or another optical disk storage, an optical disk storage (including a compact disc, a laser disc, an optical disc, a digital versatile disc, a Blu-ray disc, and the like), a magnetic disk storage medium, or another magnetic storage device, or may be any other medium that can be used to carry or store desired program code in the form of instructions or data structures and that can be accessed by a computer.

In one embodiment, the electronic device 900 may further include an antenna 940, configured to send a radio signal output by the transceiver 920.

The processor 910 and the memory 930 may be combined into a processing apparatus, and more commonly, are independent of each other. The processor 910 is configured to execute program code stored in the memory 930 to implement the foregoing functions. In specific implementation, the memory 930 may be integrated into the processor 910, or may be independent of the processor 910.

In addition, to improve functions of the electronic device 900, the electronic device 900 may further include an input unit 960, a display unit 970, and an audio circuit 980. The audio circuit 980 may further include a microphone 984, and the audio circuit 982 may also be connected to a headset 982 or the like. The display unit 970 may include a display screen.

The input unit 960 and the display unit 970 are configured to implement interaction with a user, where the input unit 960 is used by the user to enable, stop, or customize the hearing protection function. The display unit 970 is configured to display output information of the hearing protection function.

The audio circuit 980 is configured to transmit and process an audio signal, to implement various operations such as filtering and power amplification. The headset 982 may implement electro-acoustic conversion, to convert an electrical signal output by the electronic device into an acoustic signal and output the acoustic signal to the user's ear.

In one embodiment, the electronic device 900 may further include a power source 950, configured to supply power to various components or circuits in the terminal device.

It should be understood that the electronic device 900 shown in FIG. 11 can implement processes of the methods provided in the embodiments shown in FIG. 2 to FIG. 7 of this application. Operations and/or functions of the modules in the electronic device 900 are respectively intended to implement corresponding procedures in the foregoing method embodiments. For details, refer to descriptions in the method embodiments shown in FIG. 2 to FIG. 7 of this application. To avoid repetition, detailed descriptions are appropriately omitted herein.

It should be understood that the processor 910 in the electronic device 900 shown in FIG. 11 may be a System-On-a-Chip (SOC), and the processor 910 may include a central processing unit (Central Processing Unit, hereinafter referred to as CPU), and may further include another type of processor, for example, a graphics processing unit (Graphics Processing Unit, hereinafter referred to as GPU).

In conclusion, all processors or processing units in the processor 910 may cooperate with each other to implement the foregoing method procedures, and corresponding software programs of the processors or the processing units may be stored in the memory 930.

This application further provides an electronic device. The device includes a storage medium and a central processing unit. The storage medium may be a non-volatile storage medium. A computer executable program is stored in the storage medium. The central processing unit is connected to the non-volatile storage medium, and the computer executable program is executed to implement the methods provided in the embodiments shown in FIG. 2 to FIG. 7 of this application.

In the foregoing embodiments, the processors used may include, for example, a CPU, a DSP, a microcontroller, or a digital signal processor, and may further include a GPU and an embedded neural-network processing unit (Neural-network Process Units, hereinafter referred to as NPU) and an image signal processor (Image Signal Processing, hereinafter referred to as ISP). The processors may further include a necessary hardware accelerator or logic processing hardware circuit, such as an ASIC or one or more integrated circuits configured to control execution of programs of the embodiments in this application. In addition, the processor may have a function of operating one or more software programs, and the software programs may be stored in a storage medium.

An embodiment of this application further provides a computer readable storage medium, where the computer readable storage medium stores a computer program, and when the computer program is run on a computer, the computer is enabled to perform the methods provided in the embodiments shown in FIG. 2 to FIG. 7 of this application.

An embodiment of this application further provides a computer program product, where the computer program product includes a computer program, and when the computer program is run on a computer, the computer is enabled to perform the methods provided in the embodiments shown in FIG. 2 to FIG. 7 of this application.

In the embodiments of this application, "at least one" means one or more, and "a plurality of" means two or more. The term "and/or" describes an association relationship between associated objects, and indicates that three relationships may exist. For example, A and/or B may indicate the following: Only A exists, both A and B exist, and only B exists, where A and B each may indicate a singular or plural form. The character "/" generally indicates that the associated objects are in an "or" relationship. "At least one of the following" or a similar expression thereof indicates any combination of the following, and includes any combination of one or more of the following. For example, at least one of a, b, or c may indicate a, b, c, a and b, a and c, b and c, or a and c, where a, b, and c may indicate a singular or plural form.

In some embodiments, the units and algorithm steps described in the embodiments disclosed in this specification can be implemented by electronic hardware or a combination of computer software and electronic hardware. Whether these functions are performed by hardware or software depends on particular applications and design constraints of the embodiments. Different methods to implement the described functions for each particular application, but it should not be considered that the implementation goes beyond the scope of this application.

For the purpose of convenient and brief description, for a detailed working process of the foregoing system, apparatus, and unit, reference may be made to a corresponding process in the foregoing method embodiments, and details are not described herein again.

In the several embodiments provided in this application, if any function is implemented in the form of a software functional unit and sold or used as an independent product, the function may be stored in a computer readable storage medium. Based on such an understanding, the embodiments of this application essentially, or the part contributing to the prior art, or some of the embodiments may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, hereinafter referred to as ROM), a random access memory (Random Access Memory, hereinafter referred to as RAM), a magnetic disk, or an optical disc.

The foregoing descriptions are merely specific implementations of this application. Any variation or replacement is within the scope disclosed in this application shall fall within the protection scope of this application. The protection scope of this application shall be subject to the protection scope of the claims.

What is claimed is:

1. A user hearing protection method, comprising:
   after an electronic device enables a hearing protection mode, when a current sound output mode of the electronic device is a headset output, obtaining current-frame sound source data;
   obtaining, based on the current-frame sound source data, sound pressure output by a headset connected to the electronic device;
   comparing the sound pressure with a predetermined sound pressure threshold; and
   if the sound pressure is greater than the predetermined sound pressure threshold, performing an instantaneous sound pressure over-standard warning and an instantaneous sound pressure over-standard protection operation,
   wherein the obtaining, based on the current-frame sound source data, sound pressure output by a headset connected to the electronic device comprises:
   obtaining a current usage scenario of the headset by a scenario obtaining submodule of an obtaining module, wherein the current usage scenario comprises audio play, video play, gaming, or making a call;
   obtaining, based on the current-frame sound source data and a sound effect change and a gain value that are of a channel corresponding to the current usage scenario, a digital signal value output to a headset interface of the electronic device;
   obtaining, based on the digital signal value and a digital-to-electrical conversion gain value of the electronic device, a voltage value output to the headset interface; and
   obtaining, based on the voltage value and an electro-acoustic conversion coefficient of the headset, sound pressure output by the headset.

2. The method according to claim 1, after the obtaining, based on the current-frame sound source data, sound pressure output by a headset connected to the electronic device, further comprising:
   storing the sound pressure corresponding to the current-frame sound source data;
   determining, based on the stored historical sound pressure data, a sound dose accumulated to a current moment;
   comparing the sound dose with a predetermined sound dose standard value; and
   if the sound dose is greater than the predetermined sound dose standard value, performing sound dose over-standard warning and a sound dose over-standard protection operation.

3. The method according to claim 1, before the obtaining current-frame sound source data, further comprising:
   detecting operation information of a user of an electronic device;
   enabling a hearing protection mode of the electronic device in response to the operation information; and
   obtaining and storing the instantaneous sound pressure over-standard protection operation and a sound dose over-standard protection operation that are set by the user.

4. The method according to claim 1, before the obtaining, based on the voltage value and an electro-acoustic conversion coefficient of the headset, sound pressure output by the headset, further comprising:

after the electronic device plays unique voice source data, obtaining electrical signal time domain data at a headset interface of the electronic device, and obtaining acoustic signal time domain data output by the headset; and obtaining the electro-acoustic conversion coefficient of the headset based on the electrical signal time domain data and the acoustic signal time domain data.

5. The method according to claim 1, wherein the obtaining, based on the voltage value and an electro-acoustic conversion coefficient of the headset, sound pressure output by the headset comprises:

converting the voltage value into electrical signal frequency domain data;

obtaining acoustic signal frequency domain data based on the electrical signal frequency domain data and the electro-acoustic conversion coefficient;

converting the acoustic signal frequency domain data into acoustic signal time domain data; and obtaining, based on the acoustic signal time domain data, the sound pressure output by the headset.

6. A user hearing protection apparatus, comprising:

an obtaining module, configured to: after an electronic device enables a hearing protection mode, when a current sound output mode of the electronic device is a headset output, obtain current-frame sound source data; and obtain, based on the current-frame sound source data, sound pressure output by a headset connected to the electronic device; and a comparison module, configured to compare the sound pressure with a predetermined sound pressure threshold; and a protection module, configured to: if the sound pressure is greater than the predetermined sound pressure threshold, perform an instantaneous sound pressure over-standard warning and an instantaneous sound pressure over-standard protection operation, wherein the obtaining module comprises:

a scenario obtaining submodule, configured to obtain a current usage scenario of the headset, wherein the current usage scenario comprises audio play, video play, gaming, or making a call;

a voltage value obtaining submodule, configured to: obtain, based on the current-frame sound source data and a sound effect change and a gain value that are of a channel corresponding to the current usage scenario, a digital signal value output to a headset interface of the electronic device; and obtain, based on the digital signal value and a digital-to-electrical conversion gain value of the electronic device, a voltage value output to the headset interface; and a sound pressure obtaining submodule, configured to obtain, based on the voltage value and an electro-acoustic conversion coefficient of the headset, sound pressure output by the headset.

7. The apparatus according to claim 6, further comprising:

a storage module, configured to: after an obtaining module obtains the sound pressure output by the headset connected to the electronic device, store the sound pressure corresponding to the current-frame sound source data; and a determining module, configured to determine, based on the stored historical sound pressure data, a sound dose accumulated to a current moment; and the comparison module is further configured to compare the sound dose with a predetermined sound dose standard value; and the protection module is further configured to: when the sound dose is greater than the predetermined sound dose standard value, perform sound dose over-standard warning and a sound dose over-standard protection operation.

8. The apparatus according to claim 6, further comprising:

a detection module, configured to: before an obtaining module obtains the current-frame sound source data, detect operation information of a user of an electronic device;

an enabling module, configured to enable a hearing protection mode of the electronic device in response to the operation information detected by the detection module; and an operation obtaining module, configured to obtain an instantaneous sound pressure over-standard protection operation and a sound dose over-standard protection operation that are set by the user; and a storage module, configured to store the instantaneous sound pressure over-standard protection operation and the sound dose over-standard protection operation that are obtained by the obtaining module.

9. The apparatus according to claim 6, wherein the obtaining module further comprises:

a coefficient obtaining submodule, configured to: before the sound pressure obtaining submodule obtains the sound pressure output by the headset, and after the electronic device plays unique sound source data, obtain electrical signal time domain data at a headset interface of the electronic device, and obtain acoustic signal time domain data output by the headset; and obtain an electro-acoustic conversion coefficient of the headset based on the electrical signal time domain data and the acoustic signal time domain data.

10. The apparatus according to claim 6, wherein:

the sound pressure obtaining submodule is configured to: convert the voltage value into electrical signal frequency domain data, and obtain acoustic signal frequency domain data based on the electrical signal frequency domain data and the electro-acoustic conversion coefficient; and convert the acoustic signal frequency domain data into acoustic signal time domain data, and obtain, based on the acoustic signal time domain data, the sound pressure output by the headset.

11. An electronic device, comprising:

a display unit; one or more processors; a memory; a single audio channel; an input unit; a plurality of application programs; and one or more computer programs, wherein the one or more computer programs are stored in the memory, the one or more computer programs comprise an instruction, and when the instruction is executed by the device, the device is enabled to perform the following steps:

after the electronic device enables a hearing protection mode, when a current sound output mode of the electronic device is a headset output, obtaining current-frame sound source data;

obtaining, based on the current-frame sound source data, sound pressure output by a headset connected to the electronic device;

comparing the sound pressure with a predetermined sound pressure threshold; and if the sound pressure is greater than the predetermined sound pressure threshold, performing an instantaneous sound pressure over-standard warning and an instantaneous sound pressure over-standard protection operation, wherein the obtaining, based on the current-frame sound source data, sound pressure output by a headset connected to the electronic device comprises:

obtaining a current usage scenario of the headset by a scenario obtaining submodule of an obtaining module, wherein the current usage scenario comprises audio play, video play, gaming, or making a call;

obtaining, based on the current-frame sound source data and a sound effect change and a gain value that are of a channel corresponding to the current usage scenario, a digital signal value output to a headset interface of the electronic device;

obtaining, based on the digital signal value and a digital-to-electrical conversion gain value of the electronic device, a voltage value output to the headset interface; and obtaining, based on the voltage value and an electro-acoustic conversion coefficient of the headset, sound pressure output by the headset.

12. The electronic device according to claim 11, wherein when the instruction is executed by the device, after the device is enabled to perform the step of obtaining, based on the current-frame sound source data, sound pressure output by a headset connected to the electronic device, the following steps are further performed:

storing the sound pressure corresponding to the current-frame sound source data;

determining, based on the stored historical sound pressure data, a sound dose accumulated to a current moment;

comparing the sound dose with a predetermined sound dose standard value; and if the sound dose is greater than the predetermined sound dose standard value, performing sound dose over-standard warning and a sound dose over-standard protection operation.

13. The electronic device according to claim 11, wherein when the instruction is executed by the device, before the device is enabled to perform the step of obtaining current-frame sound source data, the following steps are further performed:

detecting operation information of a user of an electronic device;

enabling a hearing protection mode of the electronic device in response to the operation information; and obtaining and storing the instantaneous sound pressure over-standard protection operation and a sound dose over-standard protection operation that are set by the user.

14. The electronic device according to claim 11, wherein when the instruction is executed by the device, before the device is enabled to perform the step of obtaining, based on the voltage value and an electro-acoustic conversion coefficient of the headset, sound pressure output by the headset, the following steps are further performed:

after the electronic device plays special voice source data, obtaining electrical signal time domain data at a headset interface of the electronic device, and obtaining acoustic signal time domain data output by the headset; and obtaining the electro-acoustic conversion coefficient of the headset based on the electrical signal time domain data and the acoustic signal time domain data.

15. The electronic device according to claim 11, wherein when the instruction is executed by the device, that the device is enabled to perform the step of obtaining, based on the voltage value and an electro-acoustic conversion coefficient of the headset, sound pressure output by the headset comprises:

converting the voltage value into electrical signal frequency domain data;

obtaining acoustic signal frequency domain data based on the electrical signal frequency domain data and the electro-acoustic conversion coefficient;

converting the acoustic signal frequency domain data into acoustic signal time domain data; and obtaining, based on the acoustic signal time domain data, the sound pressure output by the headset.

16. A non-transitory computer readable storage medium, wherein the non-transitory computer readable storage medium stores a computer program, and when the computer program is run on a computer, the computer is enabled to perform the method according to claim 1.

* * * * *